(12) United States Patent
Biro et al.

(10) Patent No.: US 12,246,924 B2
(45) Date of Patent: Mar. 11, 2025

(54) DUAL CONVEYOR FOR AUTONOMOUS GUIDED VEHICLE

(71) Applicant: Nidec Motor Corporation, St. Louis, MO (US)

(72) Inventors: Joshua M. Biro, St. Charles, MO (US); William D. Moore, Florissant, MO (US)

(73) Assignee: Nidec Motor Corporation, St. Louis, MO (US)

(*) Notice: Subject to any disclaimer, the term of this patent is extended or adjusted under 35 U.S.C. 154(b) by 0 days.

(21) Appl. No.: 18/489,901

(22) Filed: Oct. 19, 2023

(65) Prior Publication Data

US 2024/0043219 A1    Feb. 8, 2024

Related U.S. Application Data

(63) Continuation of application No. 17/681,038, filed on Feb. 25, 2022, now Pat. No. 11,827,455.

(60) Provisional application No. 63/154,082, filed on Feb. 26, 2021.

(51) Int. Cl.
*B65G 23/08* (2006.01)
*B65G 39/09* (2006.01)
*B65G 41/00* (2006.01)

(52) U.S. Cl.
CPC .......... *B65G 23/08* (2013.01); *B65G 39/09* (2013.01); *B65G 41/008* (2013.01); *B65G 2812/02069* (2013.01); *B65G 2812/02148* (2013.01); *B65G 2812/02168* (2013.01)

(58) Field of Classification Search
CPC ...... B65G 23/08; B65G 39/09; B65G 41/008; B65G 2812/02069; B65G 2812/02148; B65G 2812/02168; B65G 21/06
See application file for complete search history.

(56) References Cited

U.S. PATENT DOCUMENTS

| | | | | |
|---|---|---|---|---|
| 4,789,056 A * | 12/1988 | Bourbeau | ............ | B65G 15/62 |
| | | | | 198/841 |
| 5,590,757 A * | 1/1997 | Walter | ............ | B65G 21/06 |
| | | | | 198/860.2 |
| 6,685,009 B1 * | 2/2004 | Hosch | ............ | B65G 23/44 |
| | | | | 198/813 |
| 8,282,535 B2 * | 10/2012 | Huang | ............ | B65G 39/09 |
| | | | | 482/54 |
| 11,040,835 B2 * | 6/2021 | DeGroot | ............ | B65G 39/09 |

(Continued)

FOREIGN PATENT DOCUMENTS

| CN | 110436115 A | * | 11/2019 | ............ | B65G 15/02 |
| WO | WO-2015061843 A1 | * | 5/2015 | ............ | B65G 15/24 |

*Primary Examiner* — Gene O Crawford
*Assistant Examiner* — Abby A Jorgensen
(74) *Attorney, Agent, or Firm* — Hovey Williams LLP

(57) ABSTRACT

A conveyor assembly is provided for use with a mobile vehicle. The conveyor assembly includes a conveyor module. The conveyor module includes a first roller assembly. The first roller assembly includes a first rotatable roller body and a second rotatable roller body. The first and second roller bodies are interconnected to each other in such a manner as to share a first rotational axis yet be at least substantially rotationally independent of each other, such that each of the first and second roller bodies can rotate without causing or interfering with rotation of the other of the first and second roller bodies.

20 Claims, 29 Drawing Sheets

(56) References Cited

U.S. PATENT DOCUMENTS

| | | | |
|---|---|---|---|
| 2002/0125107 A1* | 9/2002 | Horton | B65G 47/5131 198/594 |
| 2005/0263374 A1* | 12/2005 | Beesley | B65G 47/5131 198/594 |
| 2018/0257870 A1* | 9/2018 | Guerra | F16C 19/54 |

* cited by examiner

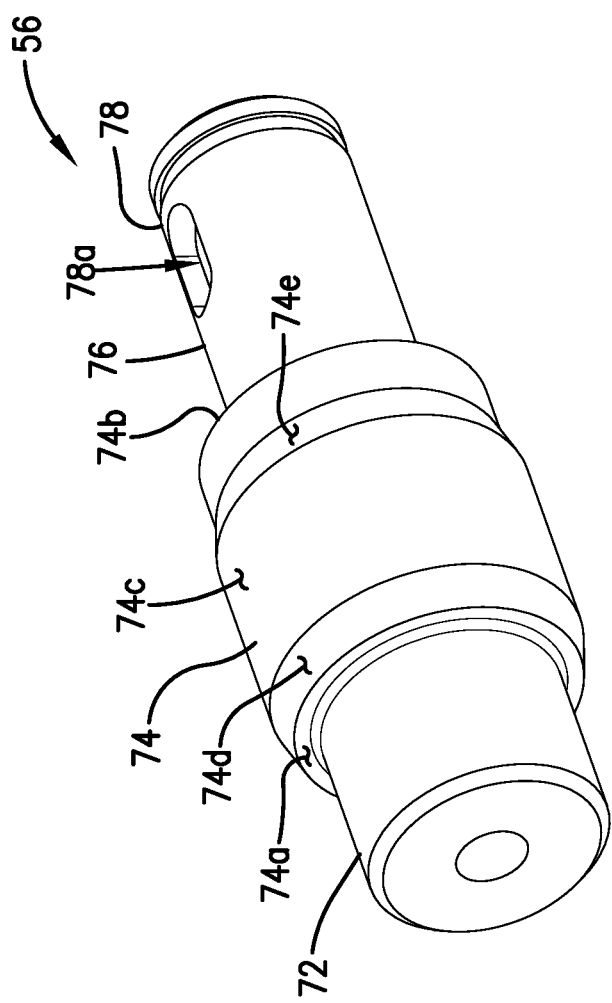
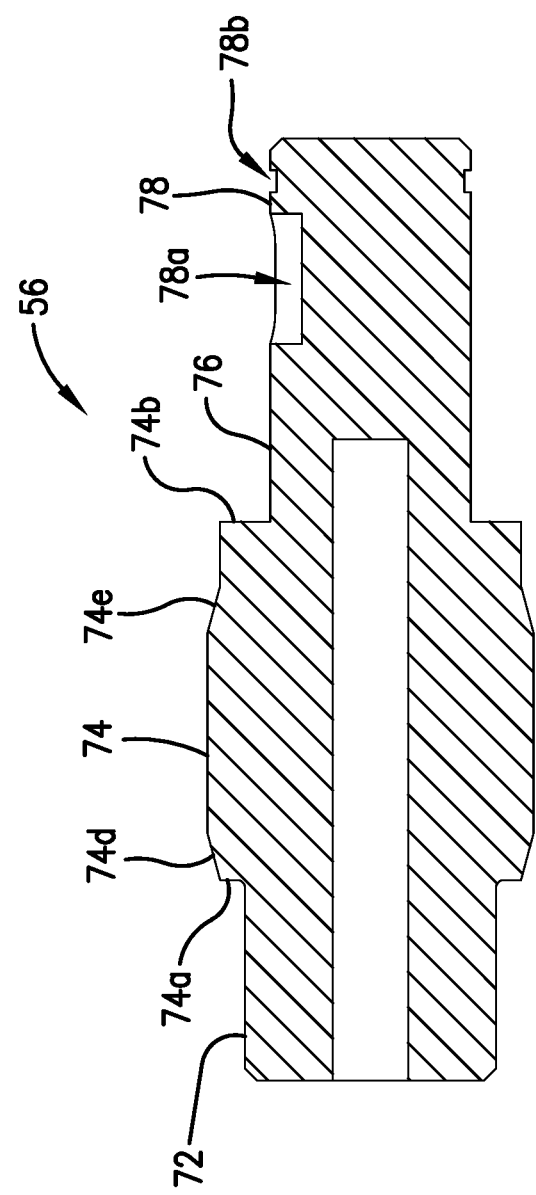

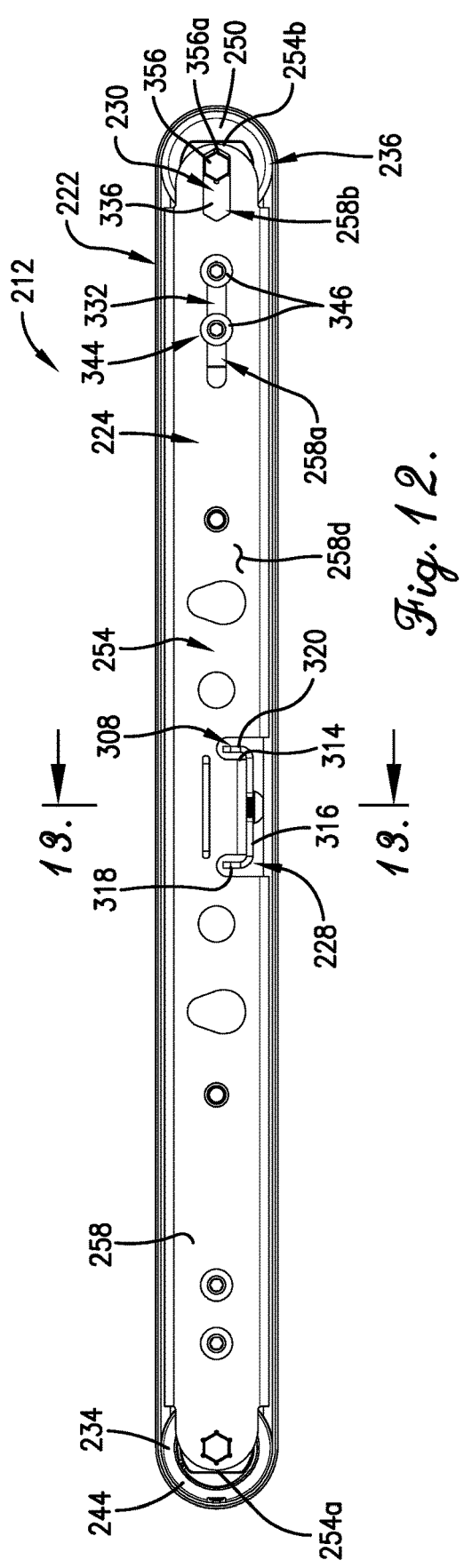
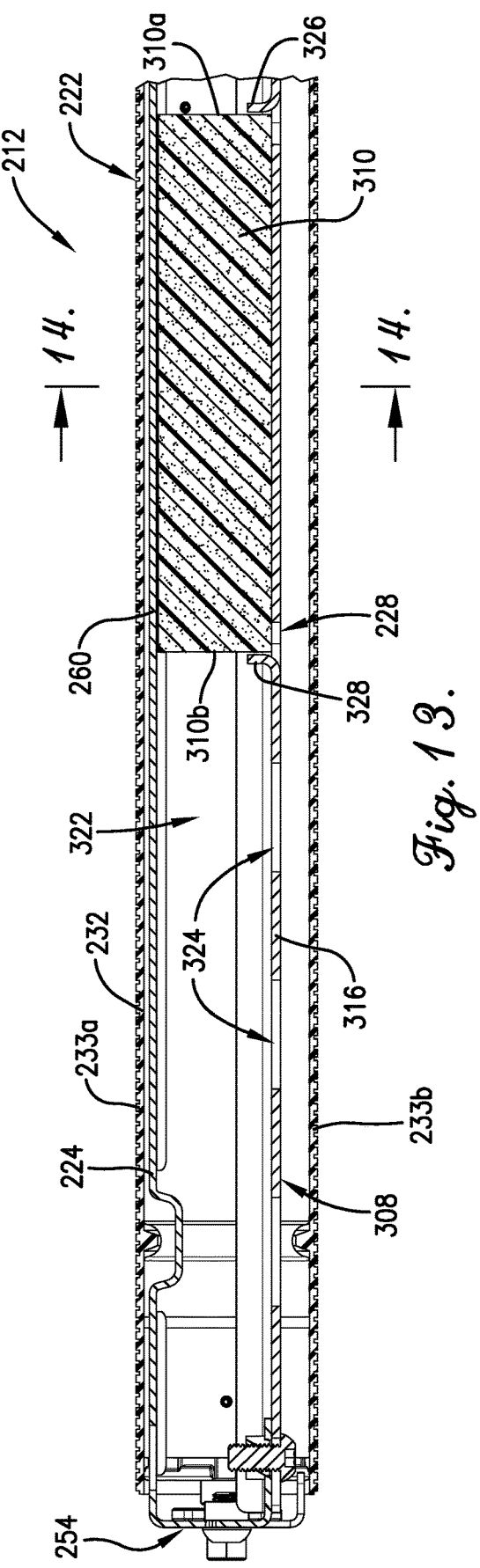
Fig. 12.
Fig. 13.

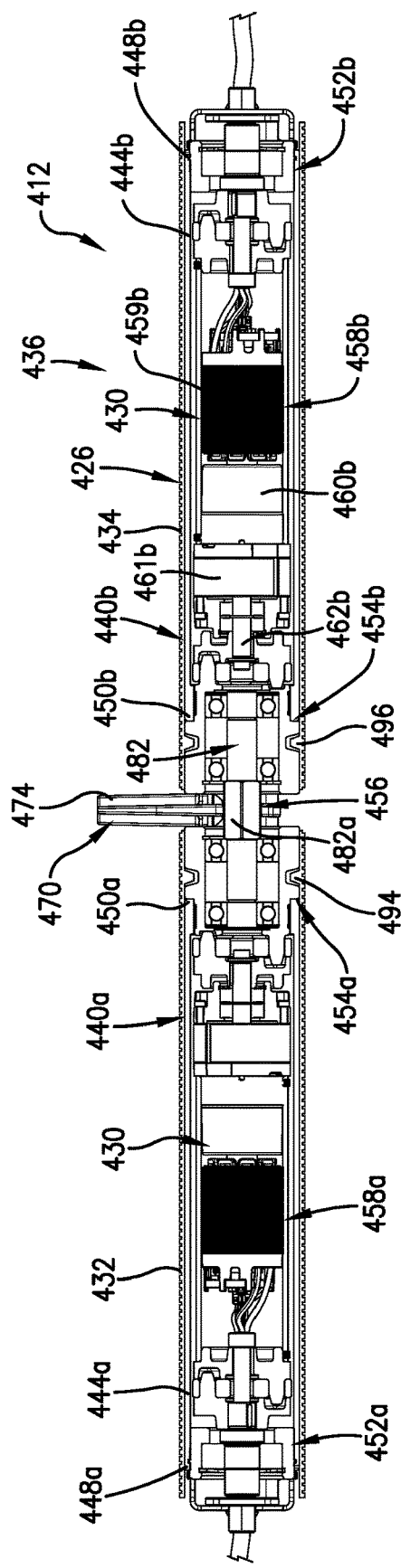
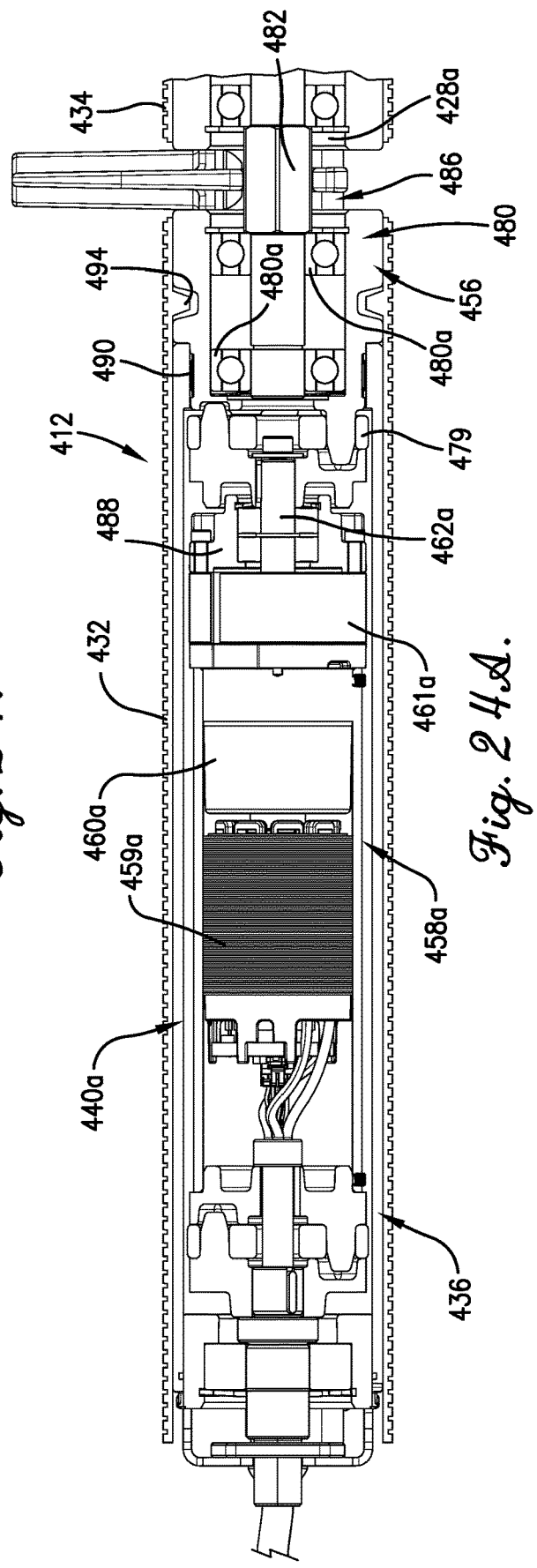
Fig. 24.
Fig. 24A.

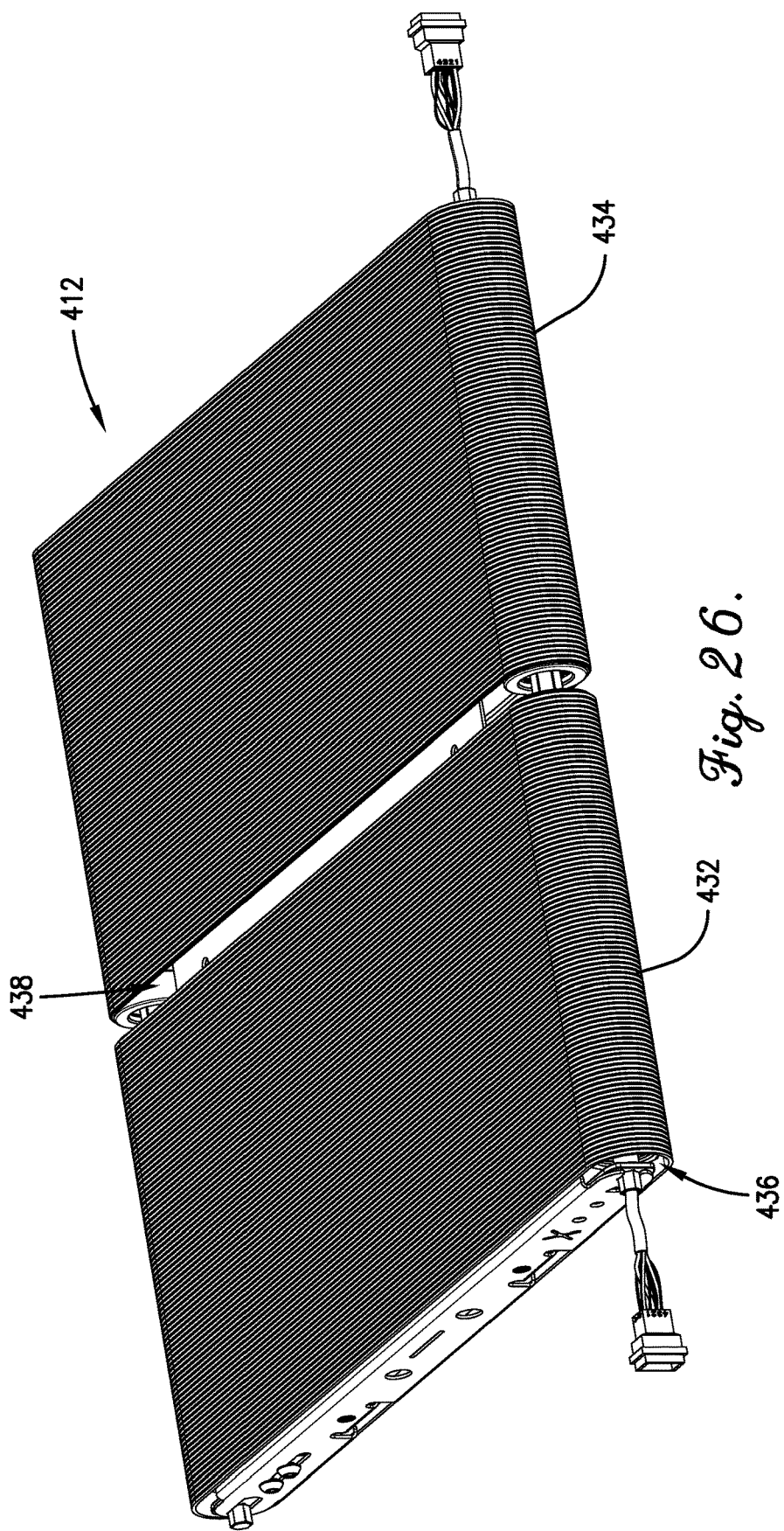

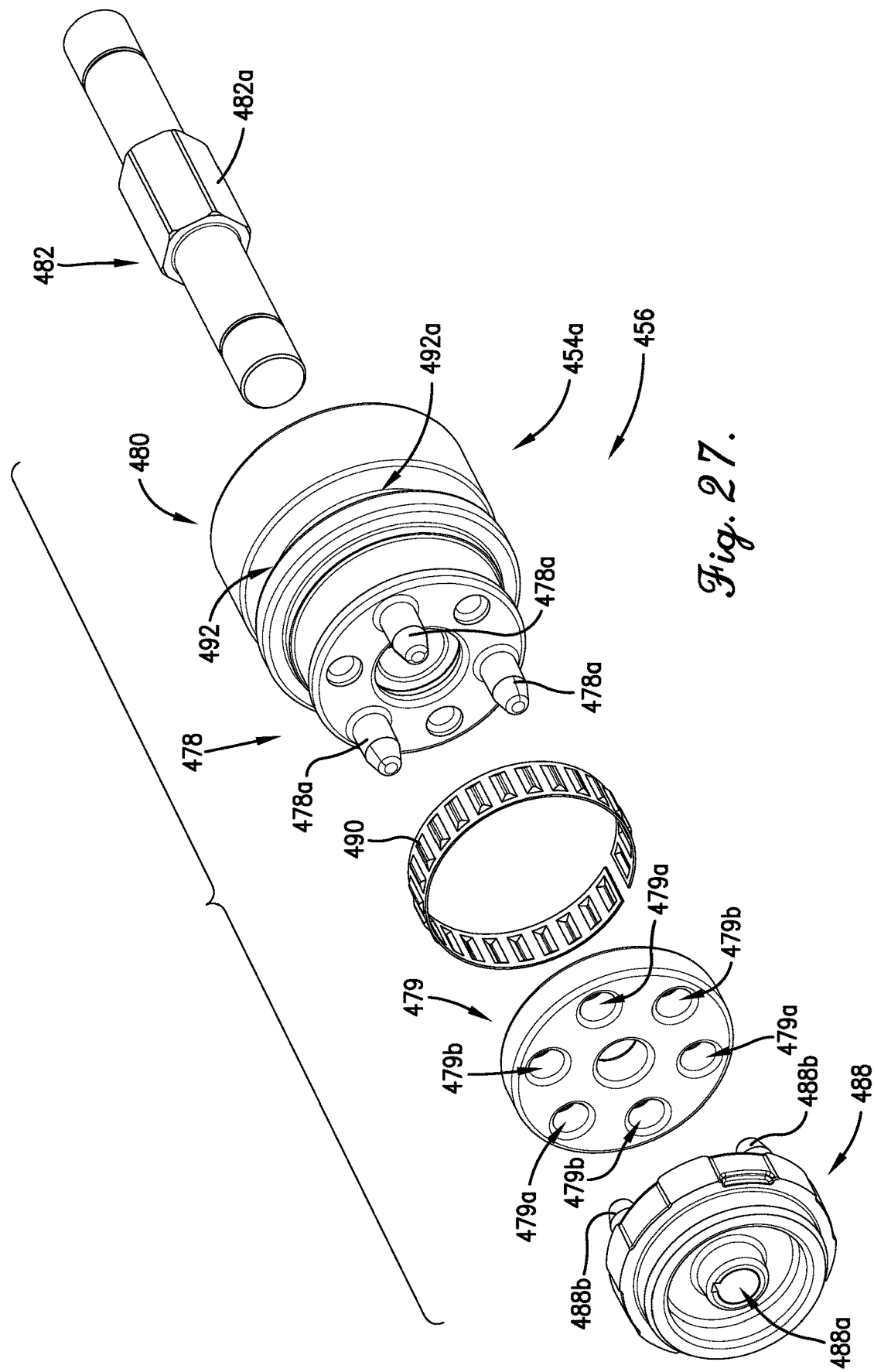

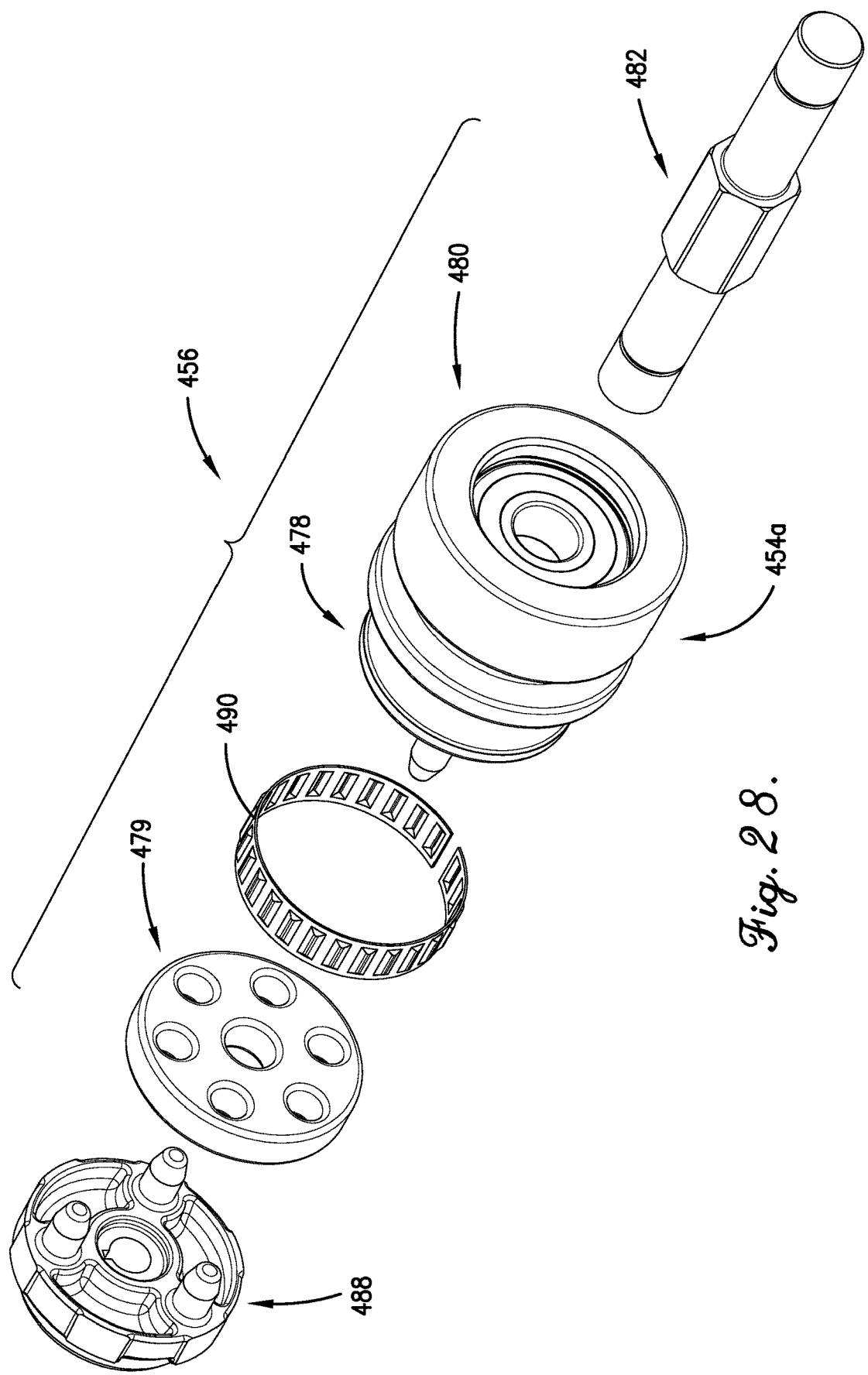

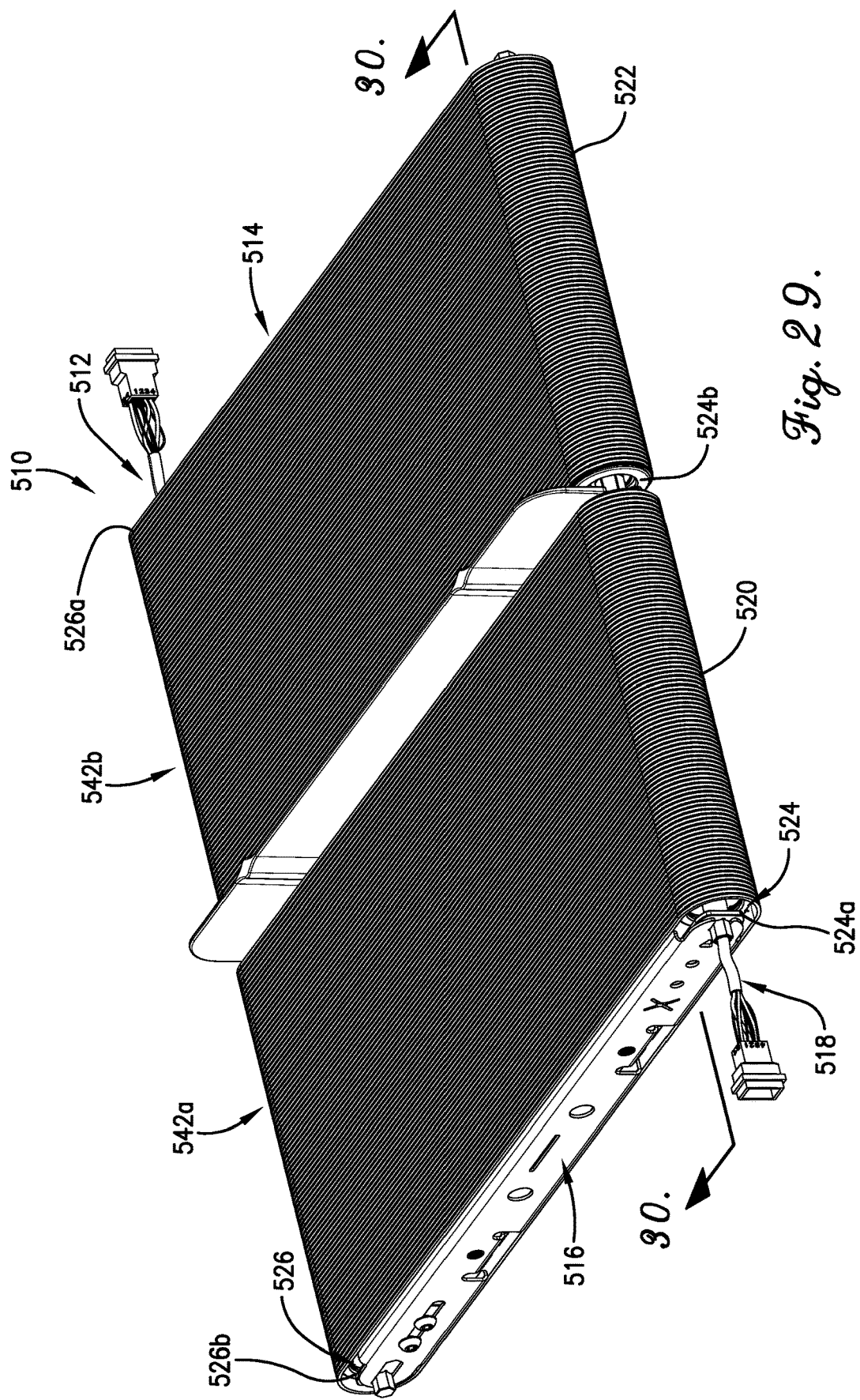

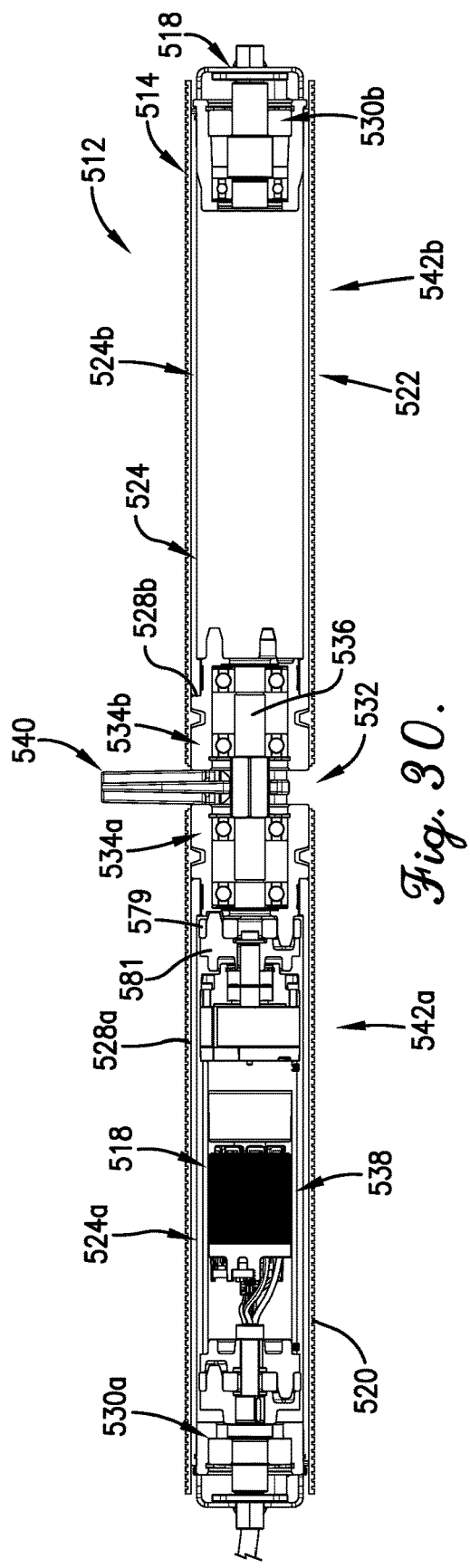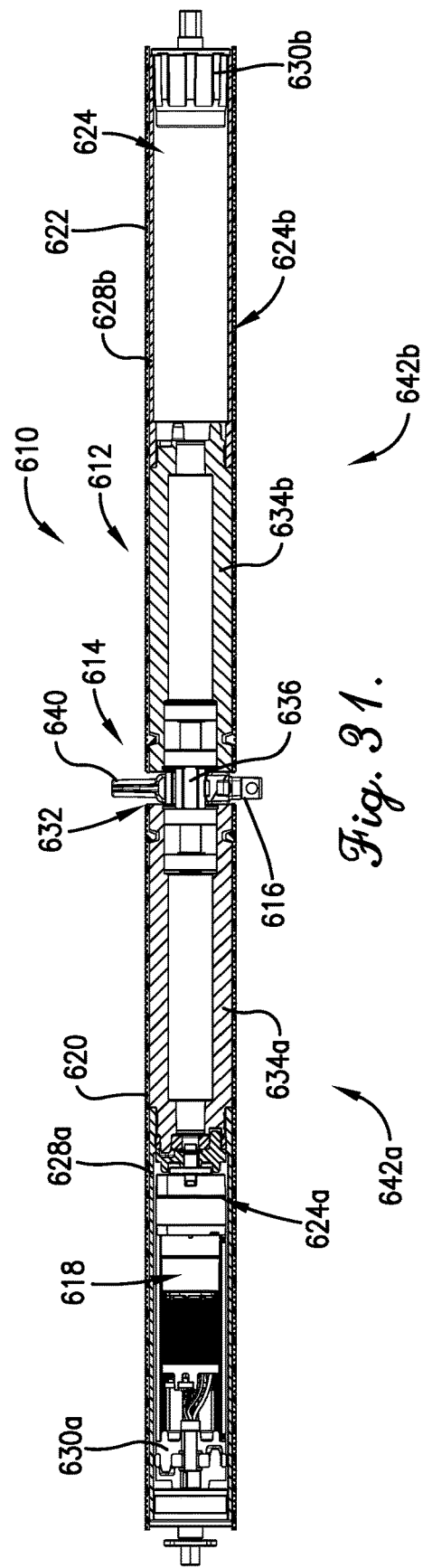

DUAL CONVEYOR FOR AUTONOMOUS GUIDED VEHICLE

CROSS-REFERENCE TO RELATED APPLICATION

1. Priority Application

The present application is a continuation of U.S. patent application Ser. No. 17/681,038, filed Feb. 25, 2022, which claims the benefit of and priority from U.S. Provisional Patent Application No. 63/154,082, filed Feb. 26, 2021, the entire disclosure of each of which is hereby incorporated by reference herein.

BACKGROUND OF THE INVENTION

1. Field of the Invention

The present invention relates generally to a motor-driven conveyor assembly.

2. Discussion of the Prior Art

Conveyor assemblies with motor-driven conveyor belts are often used in the materials handling industry for transport and/or distribution of goods in a workspace such as a commercial warehouse. Some known conveyor systems include a scrolling belt supported by a pair of rollers, with one of the rollers being rotatably powered by a motor via indirect attachment thereto (e.g., via a transmission such as a pulley drive).

SUMMARY

According to one aspect of the present invention, a conveyor assembly is provided for use with a mobile vehicle. The conveyor assembly includes a conveyor module. The conveyor module includes a first roller assembly. The first roller assembly includes a first rotatable roller body and a second rotatable roller body. The first and second roller bodies are interconnected to each other in such a manner as to share a first rotational axis yet be at least substantially rotationally independent of each other, such that each of the first and second roller bodies can rotate without causing or interfering with rotation of the other of the first and second roller bodies.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 8 is a perspective view of drive roller bearing adapter or insert;

FIG. 9 is a cross-sectional view of the drive roller bearing adapter or insert of FIG. 8;

FIG. 12 is a side view of the conveyor assembly of FIGS. 10 and 11;

FIG. 13 is a cross-sectional rear view, taken along line 13-13 of FIG. 12, of the conveyor assembly of FIGS. 10-12, particularly illustrating the stiffening assembly;

FIG. 24 is a partially sectioned front elevational view of the dually powered roller assembly of the conveyor assembly of FIG. 23, taken along line 24-24 of FIG. 23;

FIG. 24a is an enlarged view of a portion of the dually powered roller assembly as shown in FIG. 24;

FIG. 26 is a front perspective view of the conveyor assembly as shown in FIG. 23, but with the divider assembly removed;

FIG. 27 is an enlarged, exploded perspective view of a coupler and shaft of the coupling assembly of the dually powered roller assembly of FIGS. 24 and 24a;

FIG. 28 is an alternate perspective view of the coupler and shaft of FIG. 27;

FIG. 29 is a front perspective view of a conveyor assembly in accordance with a fourth preferred embodiment of the present invention;

FIG. 30 is a partially sectioned front elevational view of one of the partially powered roller assemblies of the conveyor assembly of FIG. 29, taken along line 30-30 of FIG. 29;

FIG. 31 is a is a partially sectioned front elevational view of a partially powered roller assembly of a conveyor assembly of a mobile conveyor system in accordance with a fifth preferred embodiment of the present invention.

Figure 1:
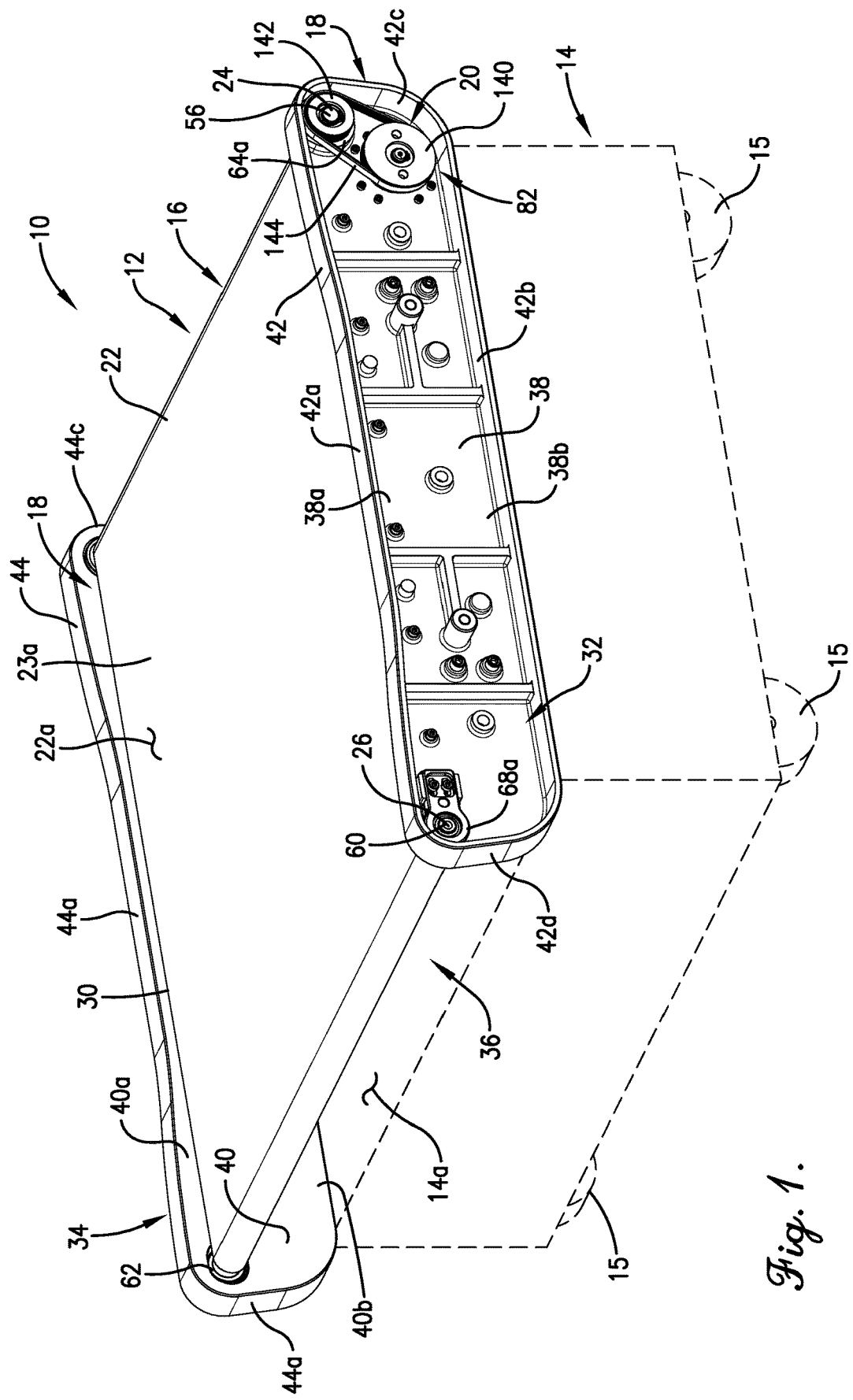
FIG. 1 is a rear side perspective view of a mobile conveyor system in accordance with a first preferred embodiment of the present invention, wherein the mobile conveyor system includes a conveyor assembly and a vehicle supporting the conveyor assembly.

The drawing figures do not limit the present invention to the specific embodiments disclosed and described herein. While the drawings do not necessarily provide exact dimensions or tolerances for the illustrated structures or components, the drawings are to scale with respect to the relationships between the components of the structures illustrated in the drawings.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Furthermore, unless specified or made clear, the directional references made herein with regard to the present invention and/or associated components (e.g., top, bottom, upper, lower, inner, outer, etc.) are used solely for the sake of convenience and should be understood only in relation to each other. For instance, a component might in practice be oriented such that faces referred to as "top" and "bottom" are sideways, angled, inverted, etc. relative to the chosen frame of reference.

Conveyor System—First Embodiment—Tensioning Device

Figure 2:
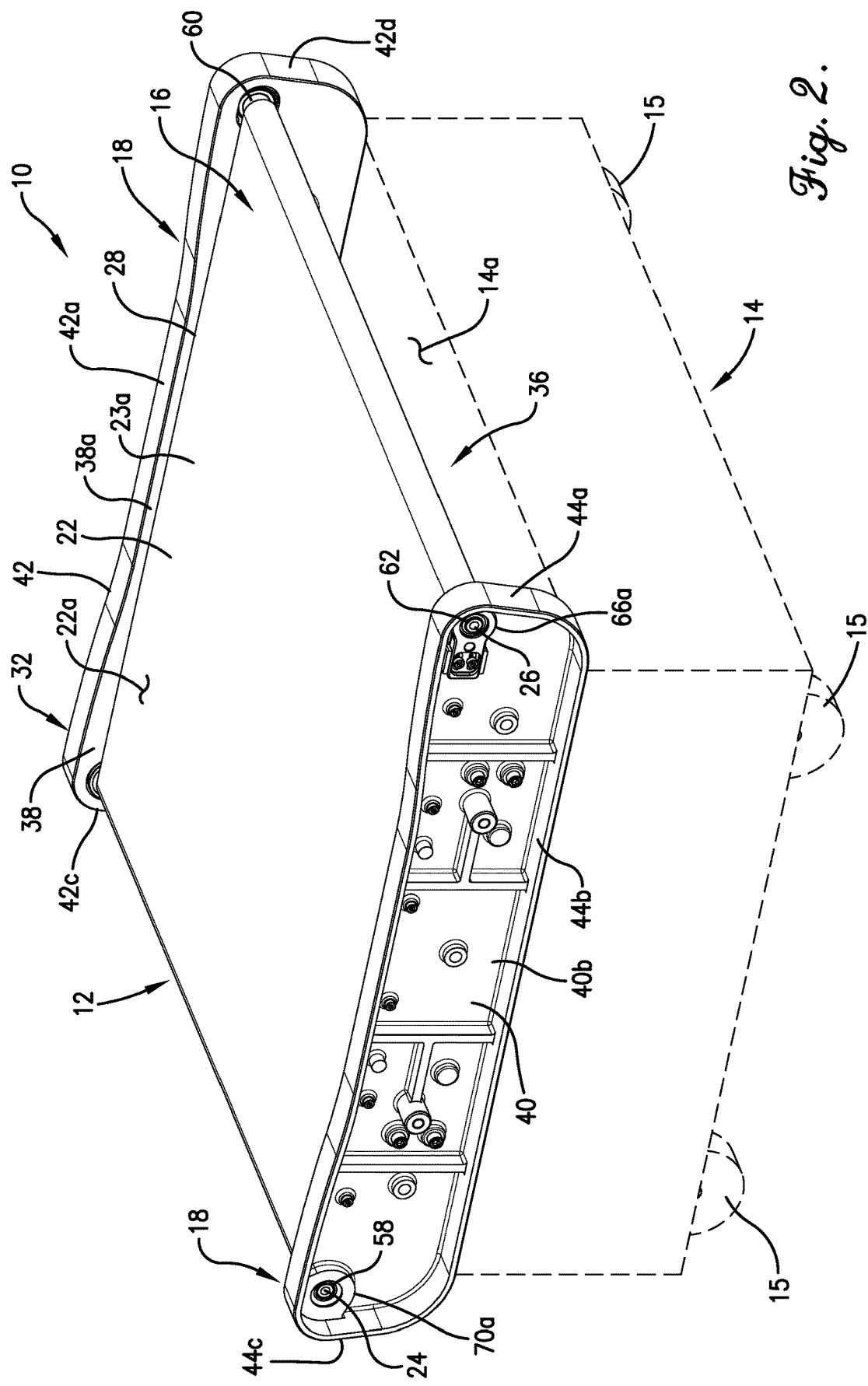
FIG. 2 is an alternate rear side perspective view of the mobile conveyor system of FIG. 1.
Figure 3:
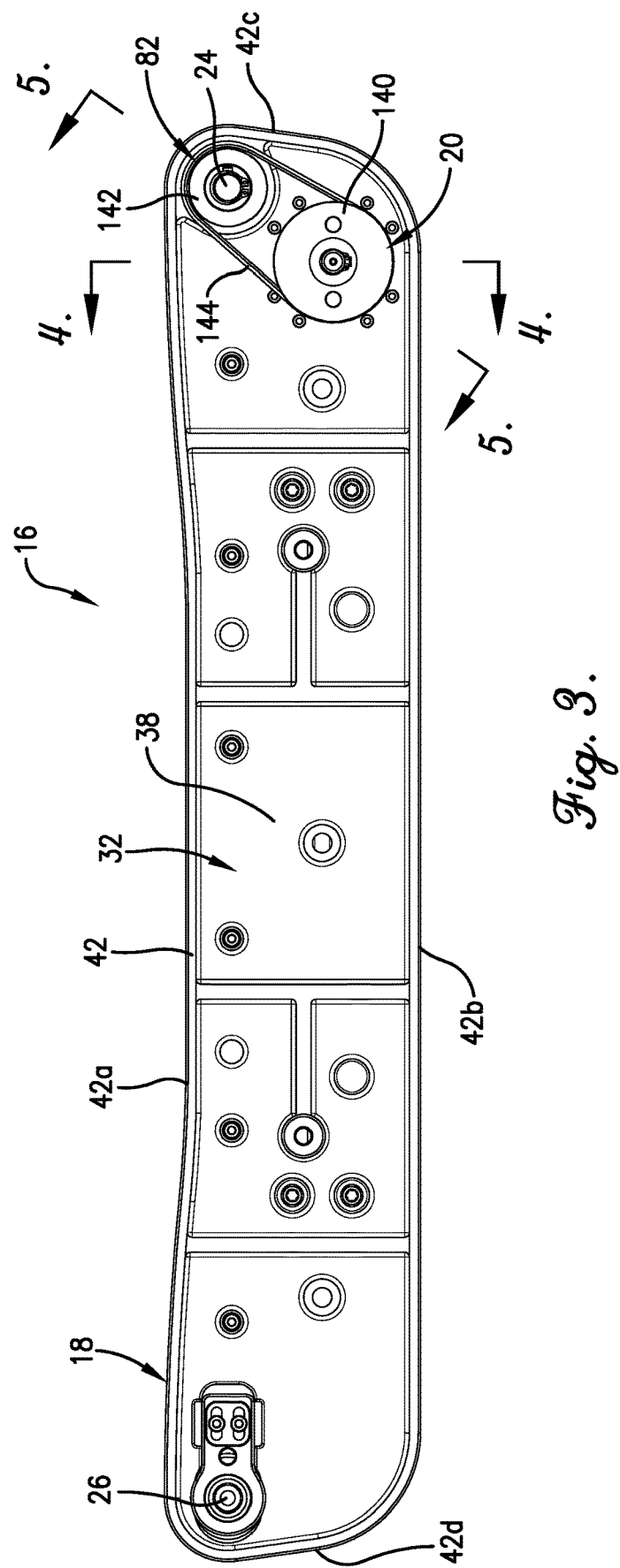
FIG. 3 is a side view of the conveyor assembly of FIGS. 1 and 2.

With initial reference to FIGS. 1 and 2, a mobile conveyor system 10 is provided. The mobile conveyor system 10 preferably comprises a conveyor assembly 12 and a vehicle 14 (shown schematically in hidden line). The conveyor assembly 12 is preferably mounted on and supported by the vehicle 14 in any manner providing suitable stability. More particularly, the conveyor assembly 12 preferably is fixed to a top surface 14a of the vehicle 14.

The vehicle 14 is preferably moveable to facilitate positioning/repositioning of the conveyor system 10 as a whole and, consequently, of the conveyor assembly 12. In the illustrated embodiment, for instance, the vehicle 14 includes a plurality of wheels 15.

Most preferably, the vehicle 14 is powered, such that selective movement of the vehicle 14 may be accomplished through use of one or more vehicle motors (not shown) or other power sources. In a preferred embodiment, for instance, each of the wheels 15 is a drive wheel powered by a respective motor.

Movement of the vehicle 14 is most preferably automated, with the vehicle 14 being an autonomous guided vehicle (AGV) or robot. Detailed descriptions of suitable embodiments of the vehicle 14 may be found in U.S. patent application Ser. No. 14/960,138, U.S. patent application Ser. No. 15/047,244, U.S. Patent Application No. 15,331,560, and U.S. patent application Ser. No. 15/433,923, each of which is incorporated in its entirety by reference herein.

Although a vehicle of the type described above is preferred, it is noted that movement may be controlled in any one or more of a variety of manners without departing from the scope of the present invention. For instance, vehicle movement might be controlled through an onboard user interface, be controlled remotely, or be manually controlled.

Still further, movement of the vehicle may be facilitated in a manner other than or in addition to wheeled rolling. For instance, the vehicle might additionally or alternatively be slidable, tracked, etc.

It is also permissible according to some aspects of the present invention for the conveyor assembly to be intended for stationary placement or have a limited range of motion. In such an instance, the vehicle might be omitted and replaced with a framework or other supporting structure fulfilling the particular positioning needs of the given application.

In a preferred embodiment, the conveyor assembly 12 broadly includes a conveyor module 16, a chassis 18, and a power module 20. As will be discussed in greater detail below, the conveyor assembly 12 is configured to facilitate the advancement of one or more items (not shown) supported thereon.

Conveyor Module

The conveyor module 16 preferably includes a conveyor belt 22, a drive or powered roller 24, and a driven or following/passive roller 26. The conveyor belt 22 preferably extends in fore and aft directions along a fore-aft or longitudinal axis of the conveyor module 16. The drive roller 24 and the driven roller 26 preferably extend parallel to one another and orthogonal to the longitudinal axis, in lateral or side-to-side directions. The rollers 24 and 26 are furthermore spaced from one another in the fore and aft direction (i.e., along the longitudinal axis).

The conveyor belt 22 preferably extends along the longitudinal or fore-aft axis to form a single, continuous (i.e., endless) loop around the rollers 24 and 26. More particularly, the conveyor belt 22 presents discrete lateral sides 28 and 30 but has no fore or aft edges. As will be discussed in greater detail below, rotation of the rollers 24 and 26 results in corresponding circulation of the conveyor belt 22 such that a given portion of the conveyor belt 22 presents an upper belt surface 22a thereof at one moment but later, upon sufficient rotation of the rollers 24 and 26, presents a lower belt surface 22b the conveyor belt 22. Furthermore, at any given moment, the conveyor belt 22 presents an upper run 23a extending between and above the rollers 24 and 26, as well as a lower run 23b extending between and below the rollers 24 and 26.

Most preferably, the conveyor belt 22 is entirely continuous, although it is permissible according to some aspects of the present invention for one or more discontinuities such as slots or openings to be formed therein. However, at least some degree of longitudinal continuity is most preferable to ensure efficient scrolling operability as described above.

It is also noted that it is permissible according to some aspects of the present invention for the belt itself to include a plurality of mini-belts, roller segments, or other components that collectively or collaboratively present an item-supporting surface and function in a scrolling manner as noted above. Furthermore, the conveyor assembly or conveyor module described herein might be sub-components of a larger system.

The items supported by the conveyor belt 22 (i.e., disposed on the upper belt surface 22a thereof) may be of any one or more of a variety of types. For instance, one or more of the items might be a package or container such as a box, envelope, mailer, tube, carton, bag, tub, tote, can, drum, or crate. One or more of the items might instead or additionally be an unpackaged good or a bulk material (e.g., a particulate matter, etc.)

Chassis

The chassis 18 preferably comprises a pair of laterally spaced apart first and second side rails 32 and 34 disposed adjacent respective ones of the sides 28 and 30 of the conveyor belt 22. The first and second side rails 32 and 34 each preferably broadly extend both along and orthogonally to the longitudinal axis so as to be parallel to each other. Skewed rails or portions of the rails are permissible according to some aspects of the present invention, however.

The chassis 18 and, more particularly, the side rails 32 and 34, preferably rest on the vehicle 14 in such a manner as to elevate the conveyor belt 22 relative to the vehicle 14. That is, a gap 36 is formed between the vehicle 14 and the bottom surface 22b or lower run 23b of the conveyor belt 22.

The first and second side rails 32 and 34 are structurally similar in many regards but diverge with regard to structure associated with the aforementioned power module 20. For clarity, the first side rail 32 will therefore be referred to herein as the drive side rail 32. In contrast, the second side rail 34 will continue to be referred to herein simply as the second side rail 34. Key distinctions between the side rails 32 and 34 will be discussed in greater detail below.

With regard to common features, however, each of the side rails 32 and 34 includes a respective sidewall 38 or 40 extending upwardly and downwardly relative to the conveyor belt 22 such than a exposed upper portion 38a or 40a extends upwardly relative to the upper belt surface 22a or upper run 23a, and a lower portion 38b or 40b extends downwardly relative to the lower belt surface 22b or lower run 23b.

The drive side rail 32 further preferably includes a flange 42 including upper, lower, fore, and aft sections 42a, 42b, 42c, and 42d. The second side rail 34 similarly preferably includes a flange 44 including upper, lower, fore, and aft sections 44a, 44b, 44c, and 44d. The flanges 24 and 44 each extend laterally outwardly from the corresponding one of the sidewalls 38 and 40. The lower sections 42b and 44b of the flanges 42 and 44, respectively, are preferably configured to directly abut (i.e., rest on) the vehicle 14, although other configurations fall within the scope of the present invention.

In a broad sense, the side rails 32 and 34 provide lateral guidance to the conveyor belt 22, offer structural support to the conveyor module 16, protect and support various components of the conveyor assembly 12, and to at least some extent protect personnel from inadvertent contact with components of the conveyor assembly 12.

Figure 4:
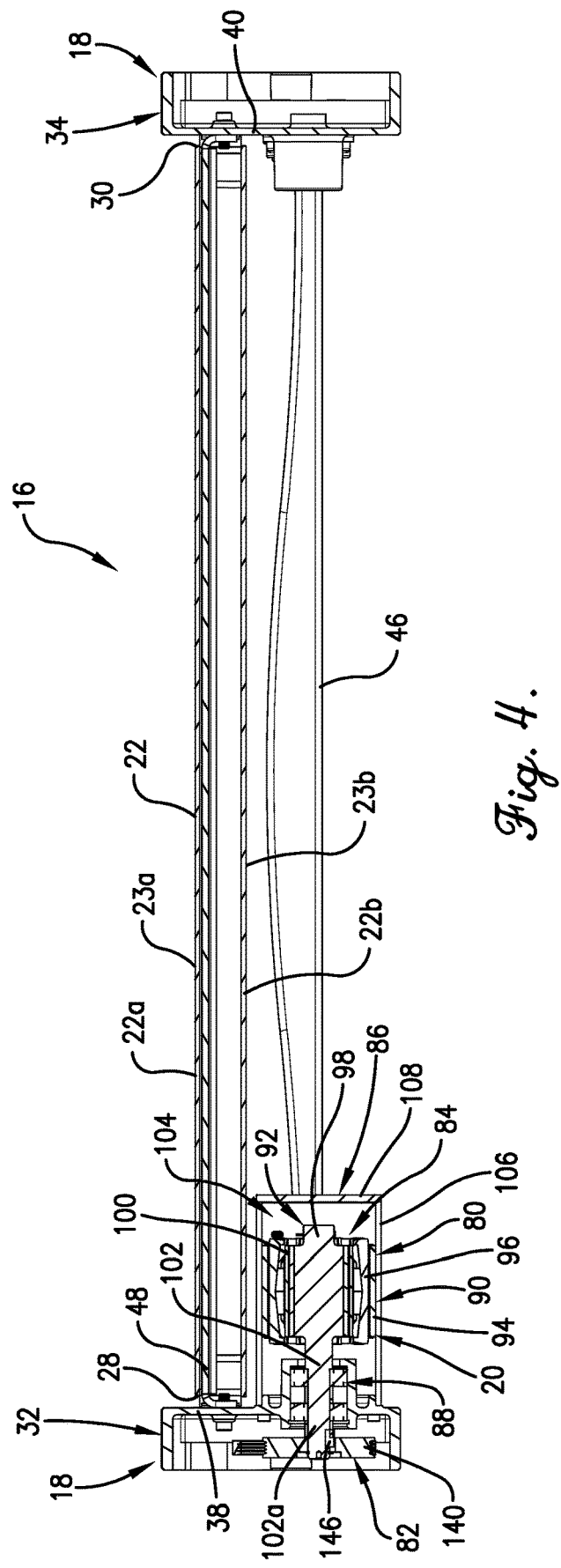
FIG. 4 is rear elevational view of the conveyor assembly of FIG. 3, taken along line 4-4 of FIG. 3.

In addition to the side rails 32 and 34, the chassis 18 further preferably includes a subframe 46 that extends between and interconnects the side rails 32 and 34. Still further, the chassis 18 preferably includes a slider bed 48 (see FIG. 4) extending between the side rails 32 and 34 and below at least a portion of the upper run 23a of the conveyor belt 22 to support the upper run 23a.

The drive or powered roller 24 preferably includes a tubular roller body 50 presenting lateral ends 50a,50b and a pair of bearing adapters or roller inserts 56 and 58 in part received within and secured to respective ones of the ends 50a,50b. As will be discussed in more details below, the roller insert 56 is a drive insert 56 and varies slightly in structure from the other insert 58.

The driven or following/passive roller 26 is preferably similarly constructed to the drive roller 24, including a tubular roller body (not shown) and a pair of bearing adapters or roller inserts 60 and 62 most preferably constructed similarly or identically to the insert 58. Alternative configurations fall within the scope of the present invention, however.

The drive roller 24 is preferably rotatably supported on the chassis 18 by a pair of roller-supporting bearings 64 and 66. Similarly, the driven roller 26 is preferably supported on the chassis 18 by a pair of roller-supporting bearings 68 and 70. More particularly, in a preferred embodiment, each of the bearings 64, 66, 68, and 70 is supported in a respective seat 64a, 66a, 68a, 70a formed by the chassis 18.

The drive insert 56 is shown in detail in FIGS. 8 and 9. As illustrated, the drive insert 56 preferably includes a circumferentially constricted inboard connector portion 72, a circumferentially enlarged intermediate or crown portion 74 outboard of the connector portion 72, and a bearing support portion 76 outboard of the crown portion 74 and circumferentially constricted relative thereto.

The connector portion 72 is preferably received within the corresponding end 52 of the roller body 50 such that the connector portion 72 and the roller body 50 rotate in unison.

The crown portion 74 preferably presents an inner shoulder 74a that engages the end 52 of the roller body 50 and an outer shoulder 74b that engages the roller-supporting bearing 64. The crown portion 74 further presents an upper face 74c that engages and guides the conveyor belt 22. Tapered faces 74d and 74e preferably extend from each lateral edge of the upper face 74c.

The roller-supporting bearing 64 is preferably disposed on the bearing support portion 76. More particularly, the roller-supporting bearing 64 preferably encircles the bearing support portion 76.

The drive insert 56 preferably further includes a pulley support portion 78 outboard of the bearing support portion 76. A slot 78a and a circumferential notch or groove 78b are preferably formed in the pulley support portion 78. The pulley support portion 78 will be discussed in greater detail below.

In a preferred embodiment, the inserts 58, 60, and 62 are identical to or very nearly identical to the drive insert 56 except in that they are devoid of a pulley support portion. However, it is permissible according to some aspects of the present invention for fully identical or more divergent inserts to be provided.

Power Module

The power module 20 preferably includes a power assembly in the form of a motor assembly 80. The power module 20 further preferably includes a drive in the form of a pulley drive 82. The pulley drive 82 is operable to transmit driving power from the motor assembly 80 to the drive insert 56, rotating the drive roller 24 and advancing the conveyor belt 22.

In a preferred embodiment, the motor assembly 80 includes a motor 84, a housing 86, and a bearing assembly 88. The motor 84 is preferably an electric motor, although other motor types fall within the scope of the present invention. Non-motor power sources (for instance, batteries) might additionally or alternatively be provided without departing from the scope of some aspects of the present invention.

Most preferably, the motor 84 includes a stator 90 and a rotor 92. The rotor 92 is rotatable about a motor axis. The motor axis preferably extends laterally (i.e. perpendicularly to the longitudinal axis), although other axis orientations fall within the scope of certain aspects of the present invention.

The stator 90 preferably at least substantially circumscribes the rotor 92, such that the motor 84 is an inner rotor motor. Outer rotor motors or dual rotor motors fall within the scope of some aspects of the present invention, however.

The stator 90 preferably includes a stator core 94 and a plurality of electrically conductive coils 96 wound about the stator core 94.

Preferably, the rotor 92 includes a rotor core 98, a plurality of magnets 100, and a rotatable output shaft 102 (which may also be referred to as a motor or rotor shaft 102). The output shaft 102 preferably extends laterally outwardly beyond the rotor core 98 and the stator 90 for purposes to be discussed in greater detail below. It is noted that a variety of additional rotor configurations, including but not limited to spoked rotor configurations, fall within the scope of the present invention.

The motor housing 86 preferably in part defines a motor chamber 104 in which the motor 84 is at least substantially disposed. That is, in a preferred embodiment, the housing 86 at least substantially encloses the motor 84. In the illustrated embodiment, for instance, the housing 86 includes a cylindrical shell 106 and an inner end wall 108. The shell 106 preferably circumscribes the stator 90, the rotor core 98, the magnets 100, and a portion of the output shaft 102. The inner end wall 108 is preferably secured by any means known in the art (e.g., welding, adhesives, latches, threaded fasteners, bolts, and/or integral formation) to an inner end of the shell 106, such that the housing 86 is closed at an inboard end thereof.

Mounting and Support of Motor

The motor 84 is preferably integrally mounted to the chassis 18, with the drive side rail 32 of the chassis 18 forming part of the housing 86. More particularly, the drive side rail 32 defines an outer endshield 110 that is preferably integrally formed by the sidewall 38. The outer endshield 110 preferably includes a disc-shaped, vertically oriented end wall 112, a circumferentially extending outer mounting lip 114, and a bearing support structure 116. The shell 106 of the housing 86 preferably circumscribes and abuts the mounting lip 114.

Preferably, the shell 106 and, more broadly, the motor assembly 80 is removably mountable to the drive side rail 32. More particularly, the motor assembly 80 is preferably removably mounted to the outer endshield 110 formed by the drive side rail 32. For instance, the mounting lip 114 preferably fits securely (e.g., via a friction fit or close slip fit) into the shell 106 such that the shell 106 and, in turn, the inner end wall 108, are supported thereon. Furthermore, it is permissible for the shell to be secured to the lip and/or the end wall via removable fasteners (such as screws or bolts), latches, or other shiftable or reconfigurable means.

However, permanent or semi-permanent connection means, including but not limited to welding, adhesives, extremely tight fits (such as friction fits or thermal fits), and integral formation fall within the scope of some aspects of the present invention. It is also permissible according to some aspects of the present invention for the shell to instead be integrally formed with the chassis or, more particularly, the sidewall of the drive side rail.

Provision of an integrated outer endshield 110 formed by the chassis 18 as described above eliminates the need for a separate endshield component, resulting in advantageous reductions in cost, complexity, and weight. Various of the features described above, including but not limited to the mounting lip 114, also facilitate reduced usage of fasteners, resulting in advantageous reductions in cost, complexity, and weight. It is noted that, although weight reduction is often deemed advantageous in motor system design, reduced weight is particularly desirable in the present invention due to mounting of the conveyor assembly 12 on the vehicle 14. That is, reducing the load that must be supported by the vehicle 14 is highly preferred.

It is also permissible according to some aspects of the present invention for the motor assembly to be devoid of the shell and/or the inner endshield. In such an embodiment, the stator might be secured directly to the chassis via threaded fasteners extending axially through the stator core and into engagement with corresponding threaded openings in the chassis. Such openings might be formed in an integral receiving pad or other suitable region of the chassis, or instead in a discrete component mounted to the chassis.

In a preferred embodiment, the bearing support structure 116 comprises a cylindrical or tube-like main body 118 and a disc-like end 120 defining a shaft aperture 122. The main body 118, the aperture 122, and the motor shaft 102 are preferably coaxial, such that the motor shaft 102 extends centrally through the aperture 122 and into a bearing pocket 124 defined internally by the main body 118 and the end 120.

The aforementioned motor bearing assembly 88 preferably includes inner and outer motor bearings 126 and 128 disposed in the bearing pocket 124 and supported by the main body 118 of the bearing support structure 116. The motor bearings 126 and 128 in turn preferably rotatably support the rotor shaft 102 and, more broadly, the motor 84 relative to the outer endshield 110 and drive side rail 32. Thus, in a preferred embodiment, the motor 84 is supported directly on the chassis 18 in a simple, efficient, removable, and lightweight manner.

It is noted that the bearing 126 and 128 preferably support the shaft 102 and, in turn, the motor 84 in a cantilevered manner. However, it is permissible according to some aspects of the present invention for the bearings to be alternatively positioned (e.g., on opposite axial ends of the rotor or shaft).

In a preferred embodiment, appropriate lateral positioning of the motor bearings 126 and 128 is effected by a spacer sleeve 130 disposed between the motor bearings 126 and 128, a retaining ring 132 secured in a groove 134 in the main body 118 adjacent the outer bearing 128, and a wavy washer 136 disposed between the inner bearing 126 and the end 120. An additional spacer sleeve 138 is disposed outboard of the outer bearing 128 to facilitate positioning of the outer bearing 128 relative to the pulley drive 82.

The motor bearings 126 and 128 are each preferably unit bearings. That is, the components of the motor bearings 126 and 128 are preferably pre-packed and fully enclosed. Such a configuration is advantageous in, among other things, preventing contaminant ingress. Other types of bearings are permissible according to some aspects of the present invention, however.

Pulley Configuration and Positioning

As noted previously, the pulley drive 82 is preferably operable to transmit rotational power from the rotor 92 to the drive insert 56 and drive or powered roller 24, resulting in fore or aft travel of the conveyor belt 22. As will be discussed in greater detail below, the pulley drive 82 preferably broadly includes a drive or powered pulley 140, a driven or passive/following pulley 142, and an endless or continuously extending drive belt 144.

More particularly, the drive or powered pulley 140 is preferably mounted to an outermost end 102a of the motor shaft 102 and spaced outwardly from the outer bearing 128 by means of the spacer sleeve 138.

Preferably, the drive pulley 140 is secured to rotate with the motor shaft 102 by means of a key 146 received in corresponding shaft and pulley slots 148 and 150, respectively. That is, the key 146 preferably ensures that rotation of the output shaft 102 corresponds directly to rotation of the drive pulley 140. However, other interconnection means facilitating cooperative rotation of the motor shaft and the drive pulley may additionally or alternatively be used.

The driven or passive/following pulley 142 is preferably disposed above and at least in part in lateral alignment with the drive or powered pulley 140. That is, the drive pulley 140 and the driven pulley 142 are at least in part coplanar in a vertical and fore-aft plane. Most preferably, such plane extends parallel to the longitudinal axis.

The driven pulley 142 is preferably mounted to the pulley support portion 78 of the drive insert 56. Most preferably, the driven pulley 142 is secured to rotate with the drive insert 56.

The drive belt 144 preferably extends in a loop about both of the pulleys 140 and 142 and is also at least in part co-planar therewith.

It is noted that correct positioning of the drive belt and pulleys 140 and 142 via co-planarity, appropriate pulley spacing, etc. is essential to efficient operation of the pulley drive 82. As will be discussed in greater detail below, the present invention advantageously facilitates correct positioning of these components.

For instance, outward lateral shifting of the drive or powered pulley 140 (along with attached structures including the motor 84) is restricted primarily via engagement of the outer motor bearing 128 against the retaining ring 132 and engagement of the drive pulley 140 against a retaining ring 152 disposed about the motor shaft 102. Laterally inward shifting of the drive pulley 140 is restricted primarily via engagement of the of the inner motor bearing 126 relative to the end 120 of the bearing support structure 116, as modulated by the wavy washer 136. The spacer sleeves 130 and 138 also play a role in positioning of the drive pulley 140.

Figure 5:
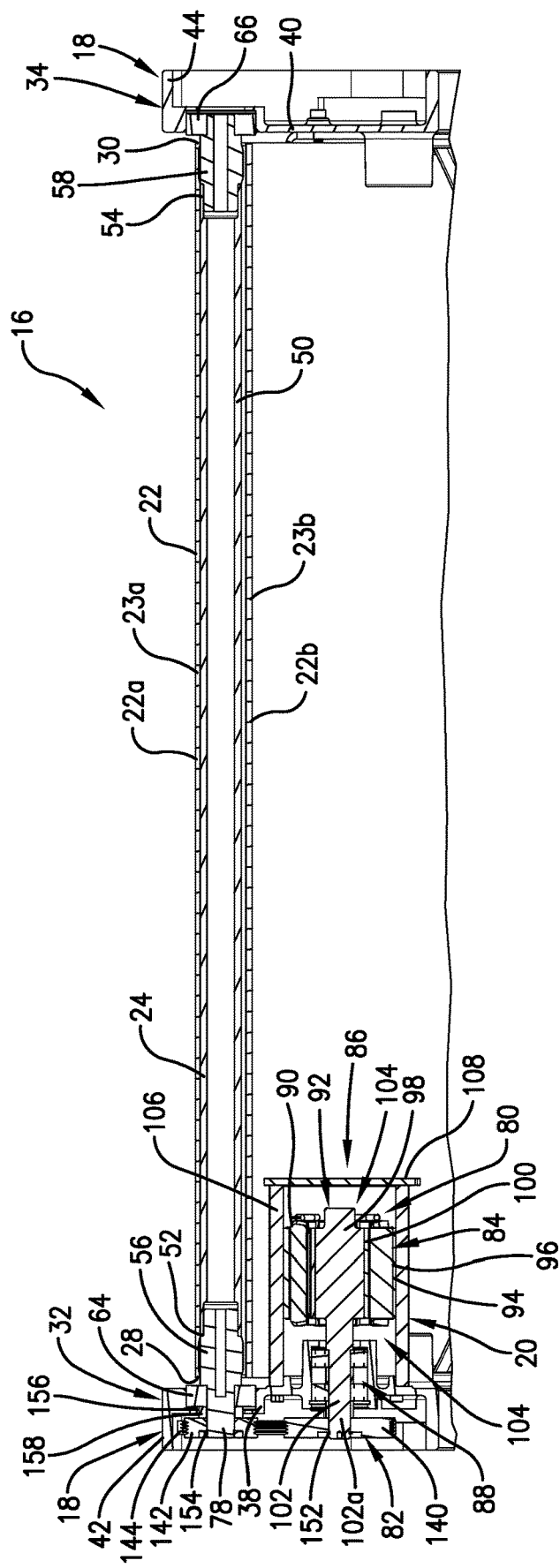
FIG. 5 is a cross-sectional view of the conveyor assembly of FIGS. 3 and 4, taken along line 5-5 of FIG. 3.
Figure 6:
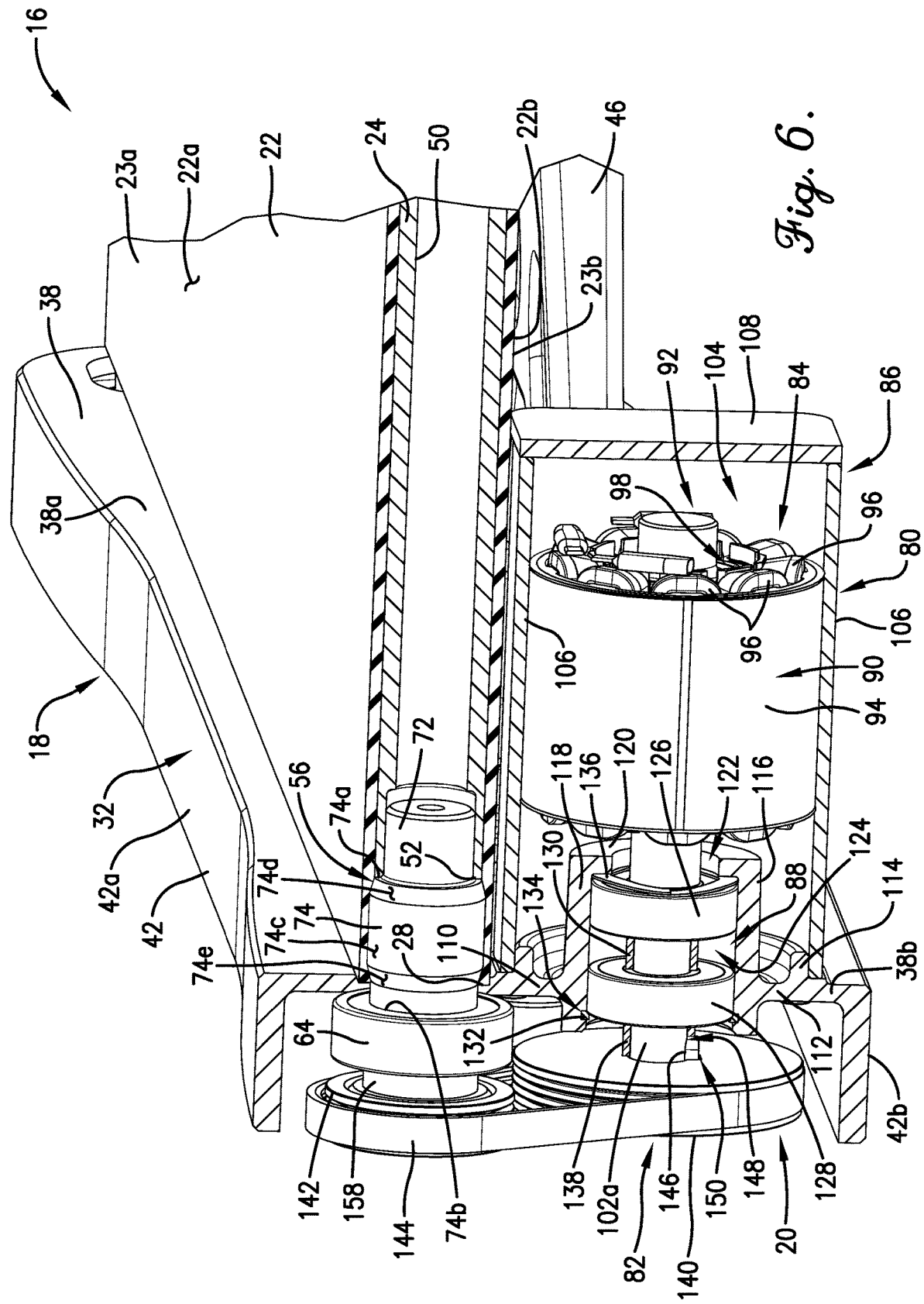
FIG. 6 is an enlarged, partially sectioned view of the conveyor assembly of FIGS. 3-5, particularly illustrating a portion of the drive roller, the power module, and motor mounting structure formed by the chassis.
Figure 7:
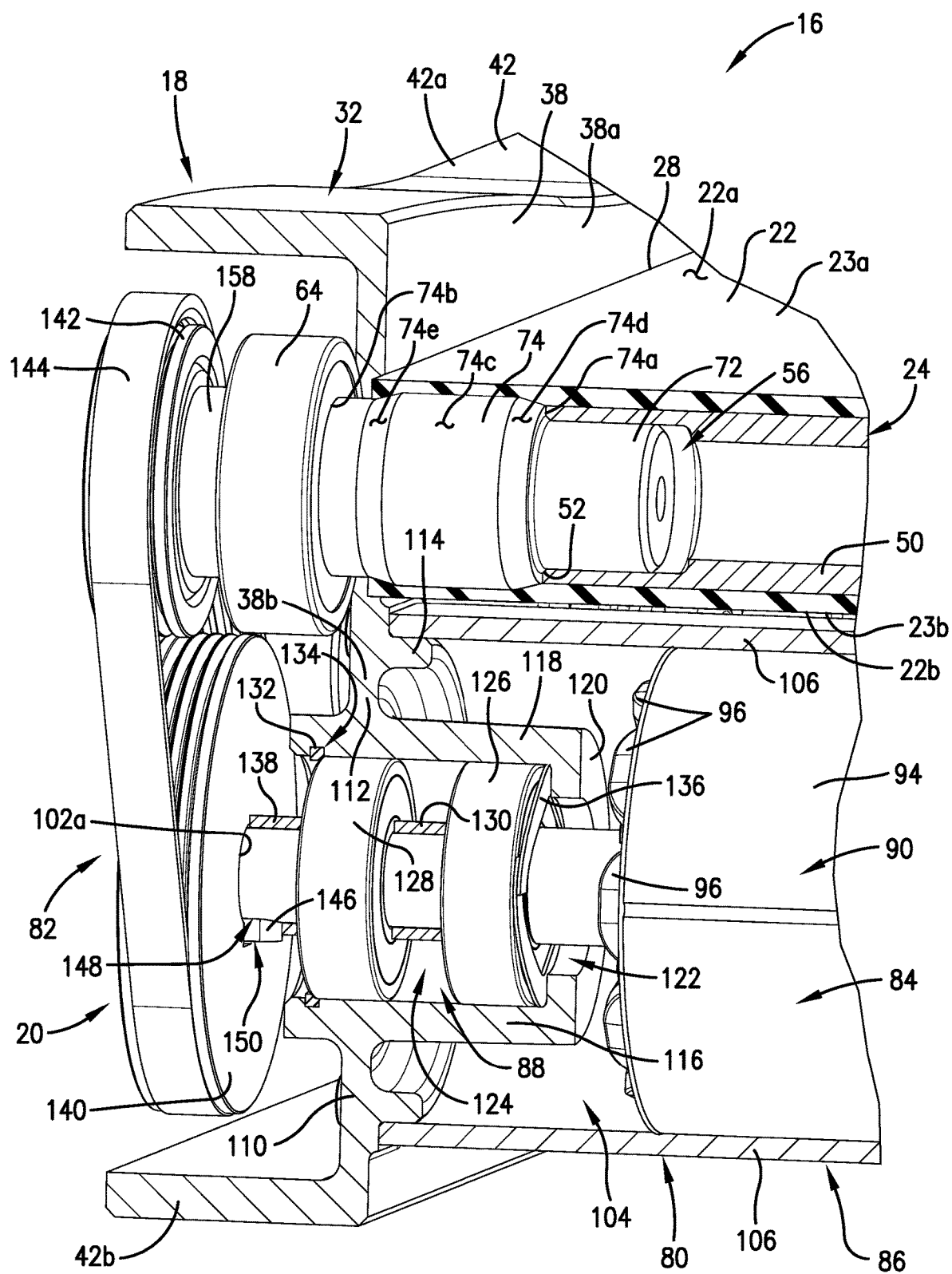
FIG. 7 is a further enlarged view of a portion of the conveyor assembly as shown in FIG. 6.

Outward lateral shifting of the driven or passive/following pulley 142 is restricted primarily via engagement of the driven pulley 142 against a retaining ring 154 disposed about the insert 56 so as to received in the notch or groove 78b, and engagement of the bearing 64 against an inner side of a shoulder 156 of the sidewall 40 of the chassis side rail 32 (see FIG. 5). Laterally inward shifting of the driven pulley 142 is restricted primarily by engagement of the driven pulley 142 with an outer side of the shoulder 156 of the sidewall 40. Additional spacing control is preferably provided by a spacer 158 disposed between the driven pulley 142 and the bearing 64.

Appropriate vertical and fore-aft positioning of the drive pulley 140 is facilitated primarily by secure fitment of the motor bearings 126 and 128 within the main body 118 of the bearing support structure 116.

Appropriate vertical and fore-aft positioning of the driven pulley 142 is facilitated primarily by the positioning of the roller bearing 64 in the bearing seat 64a.

Thus, the chassis 18, the motor bearings 126 and 128, the roller bearing 64, and other components cooperate to precisely locate the drive pulley 140 and the driven pulley 142 relative to one another. Such carefully controlled positioning enables the conveyor assembly 12 and, more specifically, the pulley drive 82 thereof, to be efficiently operable without the use of a tensioning device such as an idler pulley.

Although the illustrated pulley drive configuration is preferred, it is noted that is it permissible according to some aspects of the present invention for a tensioning device (including but not limited to an idler pulley) to be provided. Furthermore, an alternative or additional device or mechanism might be provided (i.e., in lieu of or in addition to the previously described pulley drive) to transmit power from the electric motor to the drive roller. For instance, a chain and sprocket drive might be utilized Further still, although it is preferred that the motor shaft 102 directly drive the drive pulley 140, as illustrated, it is permissible according to some aspects of the present invention for the motor to be configured or mounted in such a manner as to require an intermediate transmission to transfer power from the output shaft to the drive pulley.

Conveyor System—Second Embodiment—Stiffening Assembly

Figure 10:
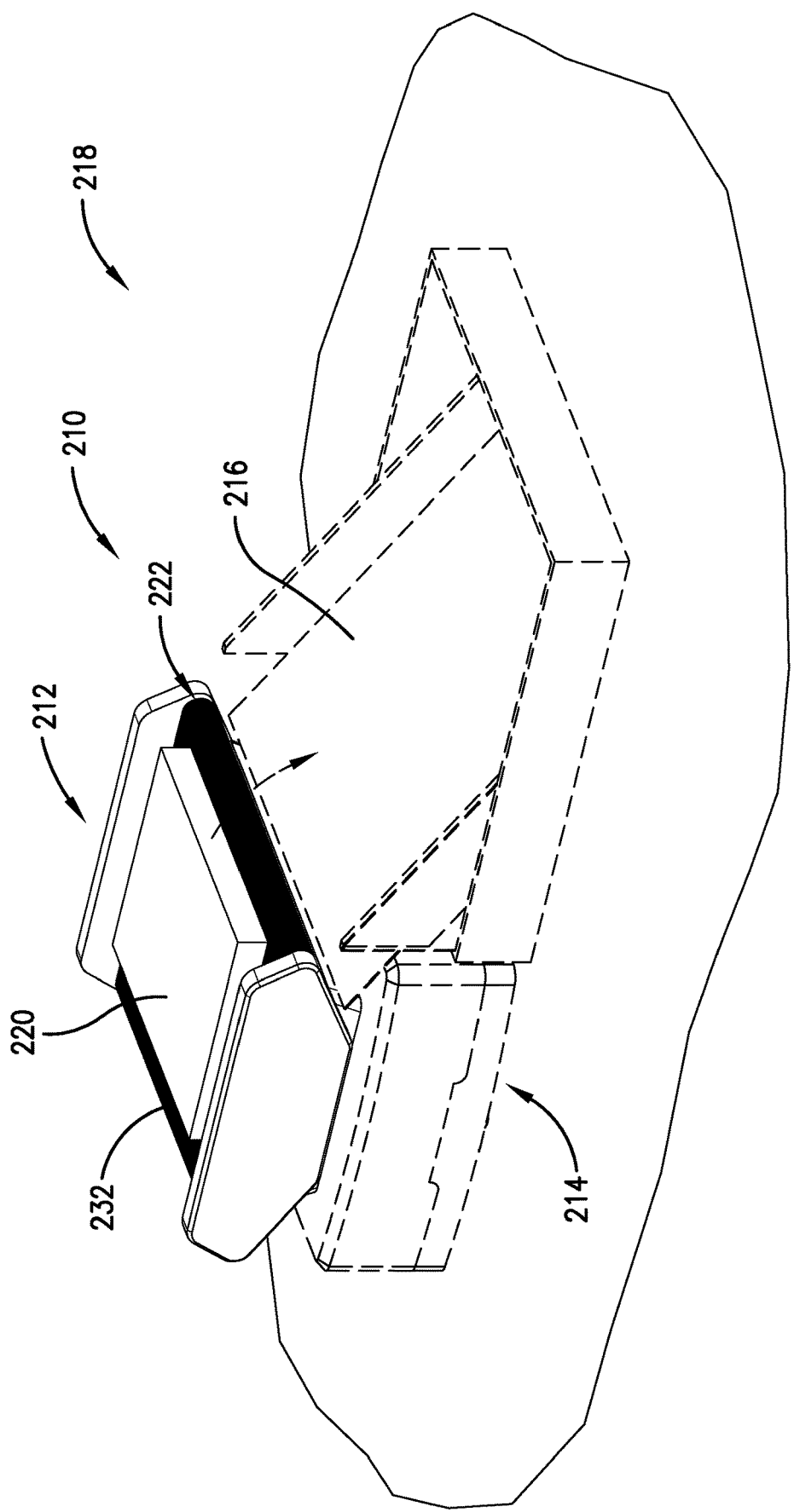
FIG. 10 is a front perspective view of a mobile conveyor system in accordance with a second preferred embodiment of the present invention, wherein the mobile conveyor system is shown in a package distribution environment and includes a conveyor assembly and a vehicle supporting the conveyor assembly.
Figure 11:
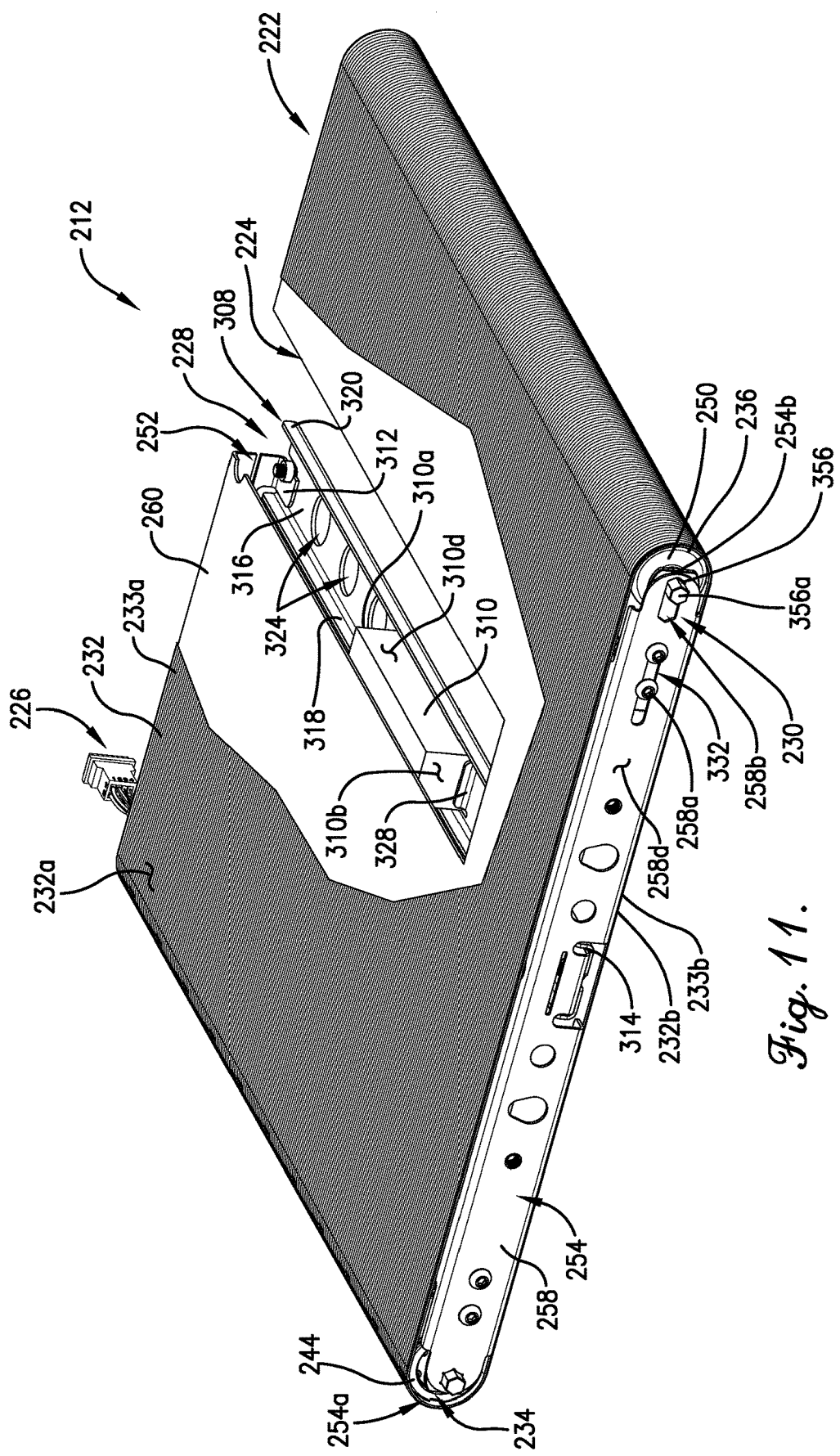
FIG. 11 is a rear perspective view of the conveyor assembly of FIG. 1.
Figure 14:
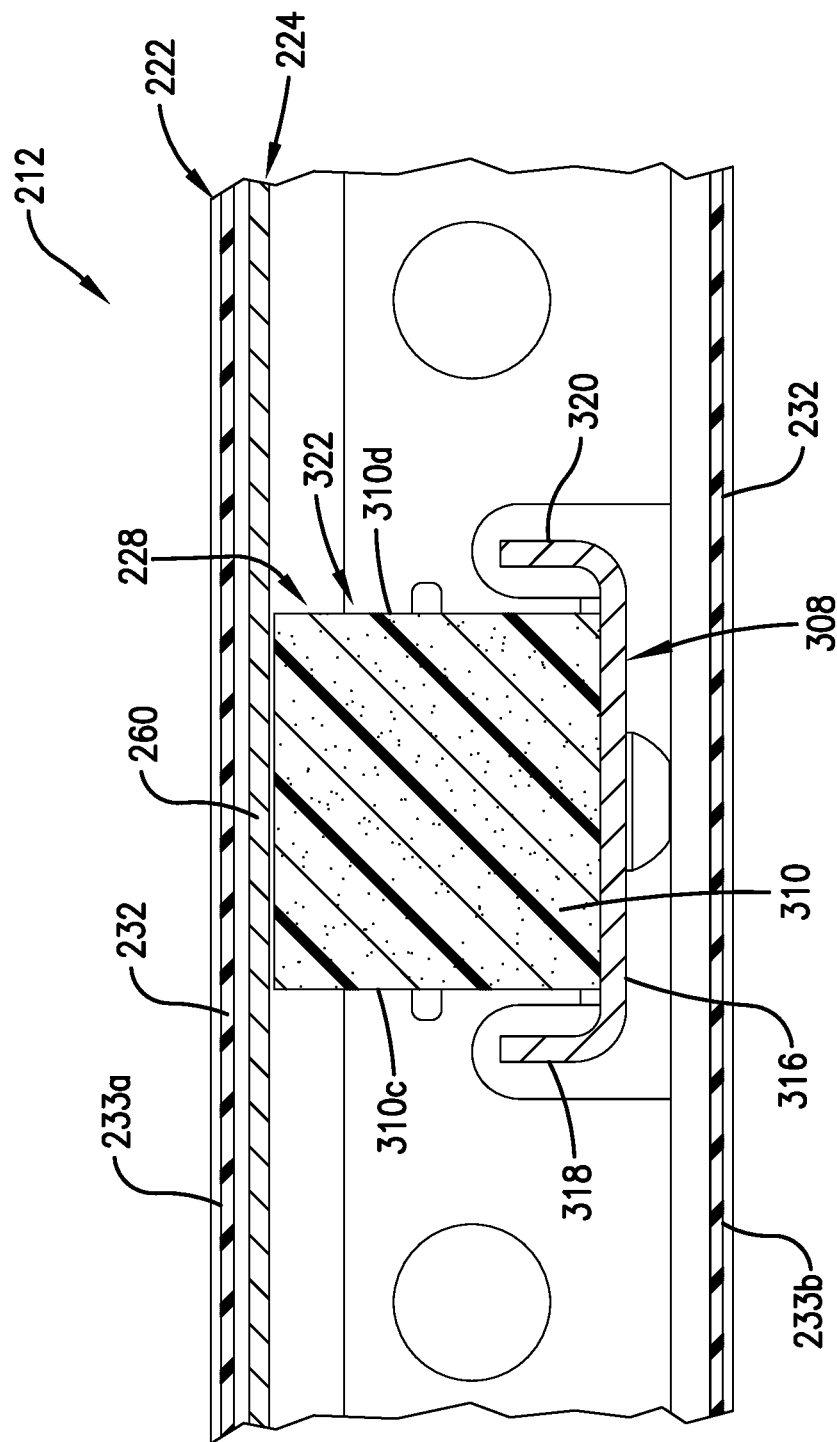
FIG. 14 is a cross-sectional side view, taken along line 14-14 of FIG. 13, of the conveyor assembly of FIGS. 10-13, further illustrating the stiffening assembly.
Figure 15:
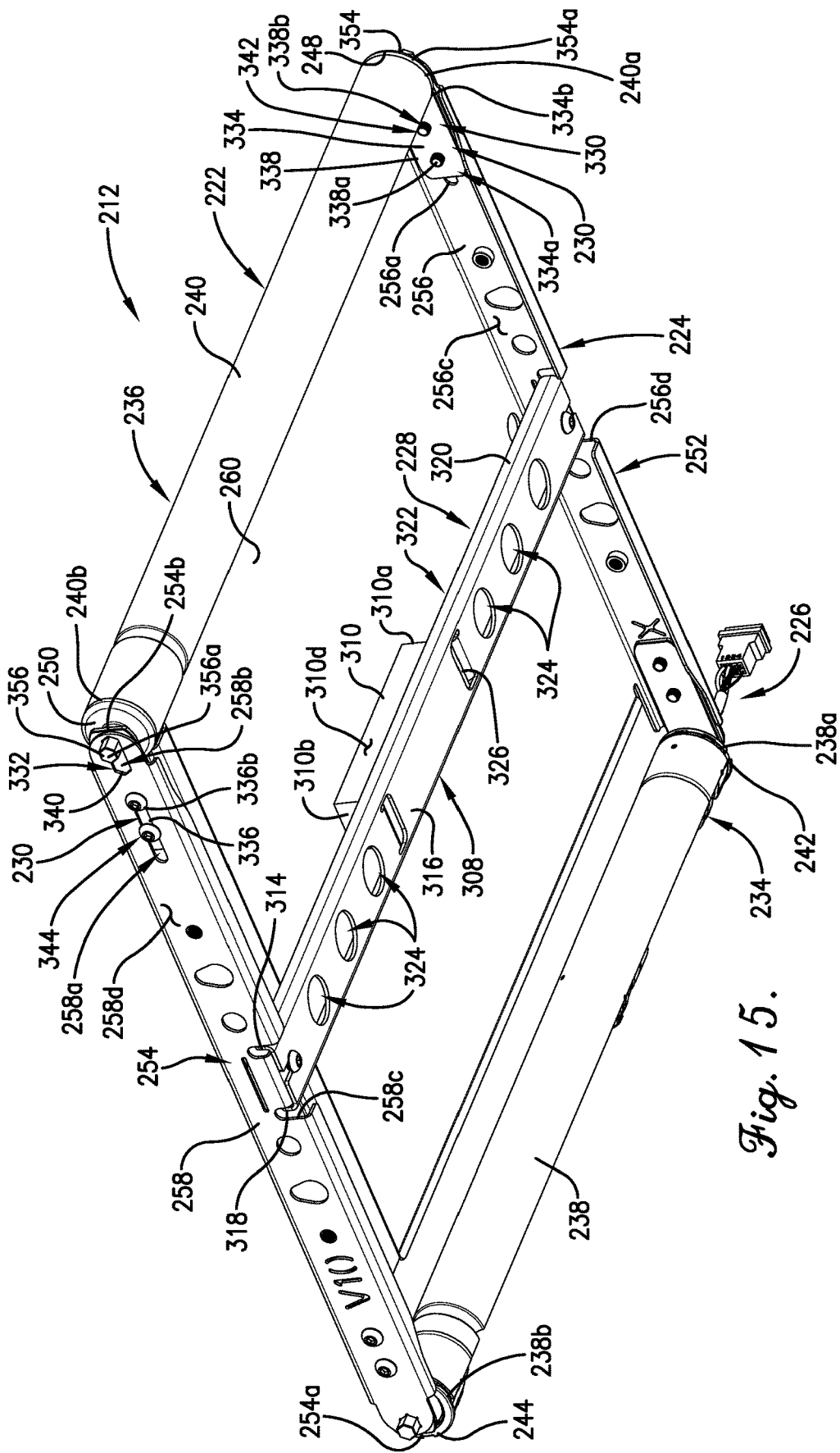
FIG. 15 is a bottom perspective view of the conveyor assembly of FIGS. 10-14, with the conveyor belt removed.

A second preferred conveyor system is illustrated in FIG. 10. It is initially noted that, with certain exceptions to be discussed in detail below, many of the elements of the conveyor system 210 of the second embodiment are the same as or very similar to those described in detail above in relation to the conveyor system 10 of the first embodiment. Therefore, for the sake of brevity and clarity, redundant descriptions and numbering will be generally avoided here. Unless otherwise specified, the detailed descriptions of the elements presented above with respect to the first embodiment should therefore be understood to apply at least generally to the second embodiment, as well.

Similarly to the conveyor system 10, the conveyor system 210 of the second preferred embodiment preferably comprises a conveyor assembly 212 and a vehicle 214 (shown schematically in hidden line).

The vehicle 214 is preferably moveable to facilitate positioning/repositioning of the conveyor system 210 as a whole and, consequently, of the conveyor assembly 212. In the illustrated embodiment, for instance, the vehicle 214 has positioned the conveyor assembly 212 adjacent a chute 216 in a package distribution center 218 to enable transfer of a package 220 from the conveyor assembly 212 to the chute 216.

As discussed above with regard to the first preferred embodiment, movement of the vehicle 214 is most preferably automated, with the vehicle 214 being an autonomous guided vehicle (AGV) or robot. However, as also discussed above, the vehicle might in alternate embodiments be differently configured or omitted entirely.

In a preferred embodiment, the conveyor assembly 212 broadly includes a conveyor module 222, a chassis 224, a power module 226, a stiffening assembly 228, and a tensioning system 230.

Conveyor Module

The conveyor module 222 preferably includes a conveyor belt 232, a drive or powered roller assembly 234, and a driven or following/passive roller assembly 236. The roller assemblies 234 and 236 are preferably spaced from one another in a fore-aft direction or, alternatively stated, along a longitudinal/fore-aft axis of the conveyor module 222. The conveyor belt 232 preferably extends along the longitudinal or fore-aft axis to form a single, continuous (i.e., endless) loop around the roller assemblies 234 and 236.

The drive or powered roller assembly 234 includes a drive or powered roller body 238 rotatable about a first or drive roller axis. The driven or following/passive roller assembly 236 includes a driven or following/passive roller body 240 rotatable about a second or passive roller axis. Rotation of the roller bodies 238 and 240 results in corresponding shifting and circulation of the conveyor belt 232 such that a given portion of the conveyor belt 232 presents an upper belt surface 232a thereof at one moment but later, upon sufficient rotation of the roller bodies 238 and 240, presents a lower belt surface 232b of the conveyor belt 232. Furthermore, at any given moment, the conveyor belt 232 presents an upper run 233a extending between and above the roller assemblies 234 and 236, as well as a lower run 233b extending between and below the roller assemblies 234 and 236.

The tensioning system 230, in cooperation with the chassis 224, facilitates the application, adjustment, setting, and maintenance of appropriate tension of the conveyor belt 232 via the setting and maintenance of appropriate longitudinal spacing between the drive and passive roller assemblies 234 and 236, respectively. The tensioning system 230 and the chassis 224 will each be discussed in greater detail below.

The drive roller body 238 is preferably tubular or cylindrical in form and presents lateral ends 238a and 238b. The drive roller assembly 234 further preferably includes a pair of bearing adapters or roller inserts 242 and 244 in part received within and secured to respective ones of the ends 238a and 238b. A intermediate insert 246 is also provided in an intermediate position between the ends 238a and 238b.

The passive roller body 240 is also preferably tubular or cylindrical in form and presents lateral ends 240a and 240b. The passive roller assembly 236 further preferably includes a pair of bearing adapters or roller inserts 248 and 250 in part received within and secured to respective ones of the ends 240a and 240b.

Chassis

The chassis 224 preferably comprises a pair of laterally spaced apart drive and second side rails 252 and 254. The side rails 252 and 254 each preferably extend in the fore-aft direction and parallel to each other to present respective fore and aft ends 252a,b and 254a,b.

In contrast to those of the first preferred embodiment, the side rails 252 and 254 of the conveyor module 222 each preferably include a respective sidewall 256 or 258 disposed at least substantially laterally outward of the conveyor belt 232 and vertically between the upper and lower runs 233a and 233b, respectively, thereof. Extension of either or both of the sidewalls upward of the upper run and downward of the lower run is permissible without departing from the scope of some aspects of the present invention, however.

In addition to the side rails 252 and 254, the chassis 224 further preferably includes a slider bed 260 extending between and interconnecting the side rails 252 and 254. The slider bed 260 is preferably disposed below at least a portion of the upper run 233a of the conveyor belt 232 to underlie and support the upper run 233a.

The chassis 224 is preferably unitarily and integrally formed. More particularly, the slider bed 260 and the side rails 252 and 254 are preferably formed unitarily and integrally with each other by means of a stamping process. That is, the slider bed 260 and the side rails 252 and 254 are preferably formed by a single piece of material, most preferably via a stamping process. It is permissible according to some aspects of the present invention, however, for the chassis to be formed by an alternative process or processes and/or to be non-integrally or non-unitarily constructed.

Most preferably, the chassis 224 comprises steel. Even more preferably, the chassis 224 comprises thin gauge steel. For instance, in a preferred embodiment of the present invention, steel having a gauge between ten (10) gauge and twenty (20) gauge is used. More preferably, steel having a gauge between twelve (12) gauge and sixteen (16) gauge is used. Most preferably, fourteen (14) gauge steel is used. However, alternative materials (including but not limited to metals such as aluminum) and/or thinner or thicker gauges fall within the scope of some aspects of the present invention.

Power Module

The power module 226 preferably provides power to the drive roller assembly 234 and more particularly, the drive roller body 238.

The power module 226 most preferably includes a power assembly in the form of a motor assembly 262. The power module 226 further preferably includes a bearing assembly 264 and one or more sensors 266.

In a preferred embodiment, the motor assembly 262 includes a motor 268 and a motor housing 270. The motor 268 is preferably an electric motor, although other motor types fall within the scope of some aspects of the present invention.

Most preferably, the motor 268 includes a stator 272 and a rotor 274. The rotor 274 is rotatable about a motor (or rotor) axis. The motor axis preferably extends laterally (i.e. perpendicularly to the longitudinal axis of the conveyor assembly 212 in a broad sense), although other axis orientations fall within the scope of certain aspects of the present invention. In the illustrated embodiment, the motor axis is coincident with the drive roller axis. That is, in a preferred embodiment, the rotor 274 and drive roller body 238 share a rotational axis.

The stator 272 preferably at least substantially circumscribes the rotor 274, such that the motor 268 is an inner rotor motor. Outer rotor motors or dual rotor motors fall within the scope of some aspects of the present invention, however.

The stator 272 preferably includes a stator core 276 and a plurality of electrically conductive coils 278 wound about the stator core 276.

Preferably, the rotor 274 includes a rotor body 280 and a rotatable output shaft 282 (which may also be referred to as a motor or rotor shaft 282). The rotor body 280 preferably comprises a rotor core 284 and a plurality of rotor magnets 286 arranged arcuately about the rotor core 284. The rotor magnets 286 preferably cooperate with the stator 272 (more specifically, the coils 278 thereof) to impart rotation to the rotor 274.

The rotor body 280 preferably defines axially spaced apart inner and outer rotor body margins 280a and 280b, respectively. As will be discussed in greater detail below, the output shaft 282 preferably projects axially from the rotor body 280 beyond the inner rotor body margin 280a but does not extend beyond the outer rotor body margin 280b. Rather, a controller 288 (e.g., a printed circuit board, as illustrated) is preferably mounted laterally outward of and immediately adjacent the outer rotor body margin 280b.

The bearing assembly 264 preferably includes a first bearing 290, a second bearing 294, and a bearing housing 294 in which the bearings 290 and 292 are seated. The bearings 290 and 292 are most preferably components of a unit bearing, as illustrated. However, a variety of bearing configurations fall within the scope of some aspects of the present invention.

Preferably the bearings 290 and 292 and, even more preferably, the entire bearing assembly 264, is disposed laterally inward of the inner rotor body margin 280a. More particularly, the rotor shaft 282 includes a bearing portion 296. The bearings 290 and 292 engage the bearing portion 296 and rotatably support the rotor 274. The motor 268 can thus be described as cantilevered (with the rotor core 284 and magnets 286 being located on a cantilevered portion of the shaft 282—i.e., these rotor components are not located between a pair of bearings).

The motor housing 270 preferably in part defines a motor chamber 298 in which the motor 268 is at least substantially disposed. In the illustrated embodiment, for instance, the housing 270 includes a cylindrical shell 300 that circumscribes the stator 272, the rotor core 284, the magnets 286, and a portion of the output shaft 282. The insert 244 preferably defines a laterally outer end of the motor chamber 298, while the intermediate insert 246 preferably defines an inner end of the motor chamber. The bearing housing 294 also preferably in part constitutes the motor housing 270 via a flange 302 disposed between the shell and the intermediate insert 246.

The output shaft 282 preferably includes a keyed end 304 disposed at least in part laterally inward of the bearing assembly 264. That is, the keyed end 304 is laterally inward of the bearing portion 296. The keyed end 304 is preferably received within the intermediate insert 246 so as to rotatably drive the intermediate insert 246. The intermediate insert 246 in turn drives rotation of the drive roller body 238 in a broad sense.

In a preferred embodiment, the controller 288 includes the aforementioned sensors 266. The sensors 266 are preferably operably connected to the controller 288 and each positioned near and slightly radially outward of the rotor magnets 286. The sensors 266 are preferably configured to detect a magnetic field and, more particularly, to detect the rotor magnets 286. Most preferably, the sensors 266 are Hall effect sensors.

It is particularly noted that provision of a unit bearing assembly 264 disposed on a single axial side of the stator 272 and the rotor body 280, in contrast to one or more bearings being disposed on each side of the stator and the rotor body, facilitates convenient positioning of the controller 288 and the sensors 266 thereof in near proximity to the rotor body 280. This positioning in turn enables the use of the rotor magnets 286 as the sensed elements for the sensors 266. Provision of a separate magnetic ring or other sensed element(s) is unnecessary. Alternatively stated, the same rotor magnets 286 are used both as sensor pickups or sensed elements and to power the motor 268.

Stiffening Assembly

As noted previously, the chassis 224 preferably includes a stiffening assembly 228. The stiffening assembly 228 comprises a bracket 308 and an insert 310. The insert 310 is preferably discrete from the bracket 308 but, as will be discussed in detail below, disposed thereon. The bracket 308 extends between and interconnects the side rails 252 and 254 and is most preferably disposed at least substantially equidistantly between the fore and aft ends 252a and 252b of the side rail 252 and the fore and aft ends 254a and 254b of the side rail 254. The bracket 308 also preferably extends perpendicularly to each of the side rails 252 and 254. However, offset positioning and/or non-perpendicular extension falls within the scope of some aspects of the present invention.

Most preferably, each side rail 252 and 254 defines a respective laterally inwardly extending lip 312 or 314. The lips 312 and 314 cooperatively support the bracket 308. More particularly, in the illustrated embodiment, the bracket 308 is bolted to the underside of the lips 312 and 314. Other mounting methods fall within the scope of some aspects of the present invention, however. For instance, screws, latches, adhesives, welds and/or other means of securement might be additionally or alternatively used.

The bracket 308 preferably includes a base 316 and a pair of sidewalls 318 and 320. The base 316 is spaced vertically below and extends planarly parallel to the to the slider bed 260 such that a vertical gap 322 is formed between the slider bed 260 and the bracket 308. The bracket 308 also preferably includes a pair of sidewalls 318 and 320 extending upwardly from the base 316 toward (but not in contact with) the slider bed 260. The sidewalls 318 and 320 might be alternatively configured or omitted in some embodiments of the present invention, however.

The bracket 308 preferably comprises aluminum, although one or more other materials might alternatively or additionally be used. Ideally, any material used for the bracket should be substantially strong and rigid while also being substantially light weight.

A plurality of perforations or openings 324 are preferably formed in the base 316, although the base might alternatively be devoid of openings therethrough. Such perforations 324 aid in weight reduction without substantial losses in strength or rigidity.

The insert 310 is disposed on the bracket 308 and extends upward across at least a portion of the gap 322. Most preferably, the insert 310 fills the entirety or almost the entirety of the vertical dimension of the gap 322 so as to contact or nearly contact the slider bed 260 when no vertically downward load is applied to the slider bed 260 (e.g., when no package 220 or similar is supported thereon). For instance, the insert 310 preferably fills at least seventy-five percent (75%) of the vertical dimension of the gap 322, more preferably at least ninety percent (90%) of the vertical dimension of the gap 322, and most preferably at least ninety-five percent (95%) of the vertical dimension of the gap 322 when the conveyor module 222 is not loaded.

The insert 310 preferably includes lateral sides 310a and 310b and fore and aft sides 310c and 310d, respectively. In a preferred embodiment, the bracket 308 defines a pair of laterally spaced apart lips 326 and 328 disposed adjacent respective ones of the lateral sides 310a and 310b. Most preferably, the lips 326 and 328 abut the lateral sides 310a and 310b and aid in securement of the insert 310 relative to the bracket 308. In contrast, the fore and aft sides 310c and 310d are preferably spaced from the sidewalls 318 and 320, although contact is permissible according to some aspects of the present invention. Additional securement of the insert 310 to the bracket 308 is most preferably not necessary, although other means, including but not limited to adhesives, latches, fasteners, etc. might additionally or alternatively be used without departing from the scope of some aspects of the present invention.

Preferably, the insert 310 comprises foam. The foam is most preferably a closed cell foam. Most preferably, the foam is a high density closed cell foam such as six (6) lb/ft' polyethylene foam. Certain variations in density, type of closed cell foam (e.g., an elastomeric foam rather than a polyethylene foam), or type of foam in a broad sense (e.g., open cell foam rather than closed cell foam) fall within the scope of some aspects of the present invention. Most preferably, however, a selected foam will provide sufficient cushioning and support; have a relatively low weight; resist dirt and moisture accumulation and absorption; be substantially tough, resilient, and puncture resistant; have an advantageous thermal insulating capacity and maintain or at least substantially maintain such capacity when subject to expected compressive forces; and be sufficiently low cost.

The bracket 308 and the insert 310 cooperatively stiffen the chassis 224 and, most preferably, resist undesirable bending, flexing, and/or other forms of deflection of the slider bed 260 as a result of vertically downward loading thereof (e.g., due to large packages 220 being disposed on the conveyor belt 232). This stiffening effect is achieved without excessive increases to the overall weight of the conveyor module 222 and in such as manner as to reduce or at least not increase operational noise. In summary, it is preferred in a broad sense that the conveyor module 222 be lightweight yet sufficiently rigid to support substantial packages 220 without excessive distortion, be economical to produce (e.g., terms of material costs, labor, etc.), and operate quietly. The present conveyor module 222 achieves these objectives through an economical and lightweight thin gauge chassis in combination with a lightweight, easy to produce, and easy to assemble stiffening assembly. A thickened chassis, one or more supplemental roller assemblies, and other conventional modifications are avoided.

Tensioning System

As noted previously, the conveyor system 210 preferably includes a tensioning system 230. More particularly, the tensioning system 230 includes a pair of tensioning devices 330 and 332 each coupled to the passive roller assembly 236 and selectively shiftably mounted to the chassis 224 such that shifting of the tensioning system 230 (and, more particularly, each of the tensioning devices 330 and 332) in the fore-aft direction along the chassis 224 results in corresponding fore-aft shifting of the passive roller body 240 relative to the drive roller body 238. The tensioning system 230 thus facilitates adjustment of the tension in the conveyor belt 232.

As will be discussed in greater detail below, each tensioning device 330 and 332 preferably includes a respective sliding bracket 334 or 336 shiftably mounted to the chassis 224. More particularly, each sliding bracket 334 or 336 is preferably mounted to a respective one of the side rails 252 and 254.

Each bracket 334 and 336 preferably includes a plate-like body 338 or 340, respectively, although other forms fall within the scope of some aspects of the present invention. The body 338 preferably defines threaded fore and aft fastener-receiving openings 338a and 338b, respectively, as well as a roller shaft opening (not shown). Similarly, the body 340 preferably defines threaded fore and aft fastener-receiving openings 340a and 340b, respectively, as well as a roller shaft opening 340c.

Each side rail 252 and 254 and, more particularly, each respective sidewall 256 or 258 thereof, preferably defines a respective positioning slot 256a or 258a extending in the fore-aft direction. The sidewall 256 defines a fore-aft extending roller shaft slot 256b. Likewise, the sidewall 258 defines a roller shaft slot 258b, also extending in the fore-aft direction.

Each tensioning device 330 and 332 further preferably includes a respective positioning fastener assembly 342 or 344, each including a pair of positioning fasteners 346.

Figure 16:
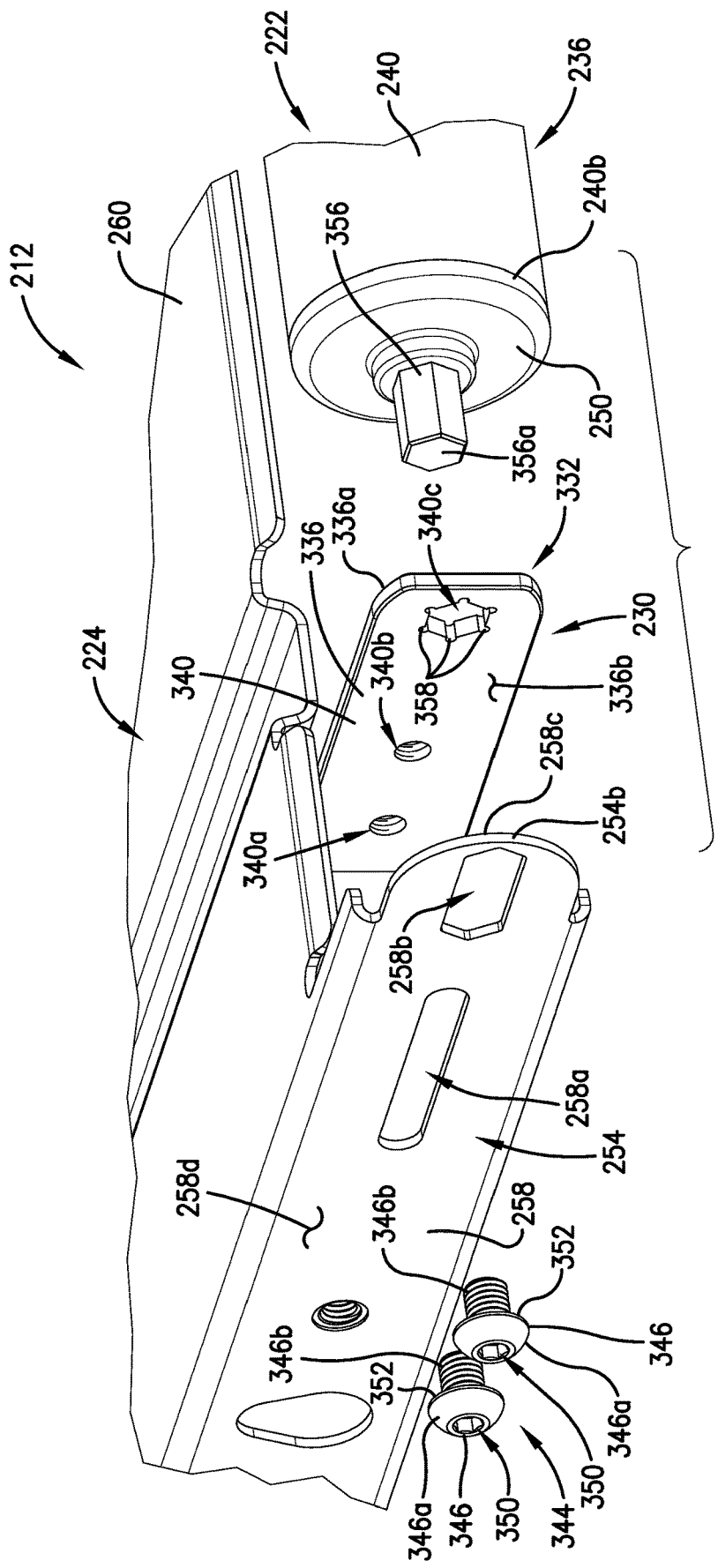
FIG. 16 is an enlarged, partially exploded rear perspective view of a portion of the conveyor assembly of FIGS. 10-15, particularly illustrating the tensioning system.
Figure 17:
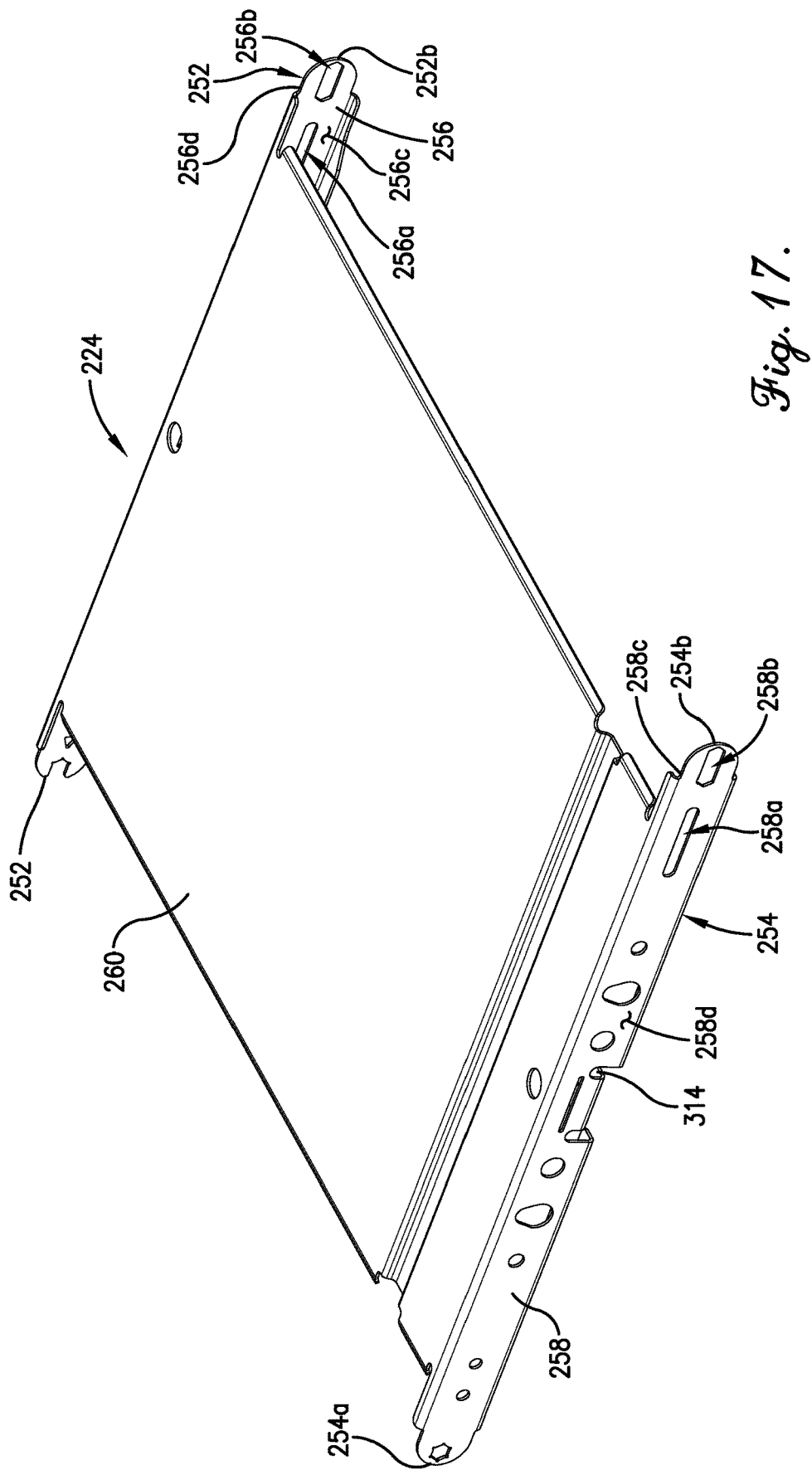
FIG. 17 is a top, rear perspective view of the chassis of the stiffening assembly of the conveyor assembly of FIGS. 10-16.
Figure 18:
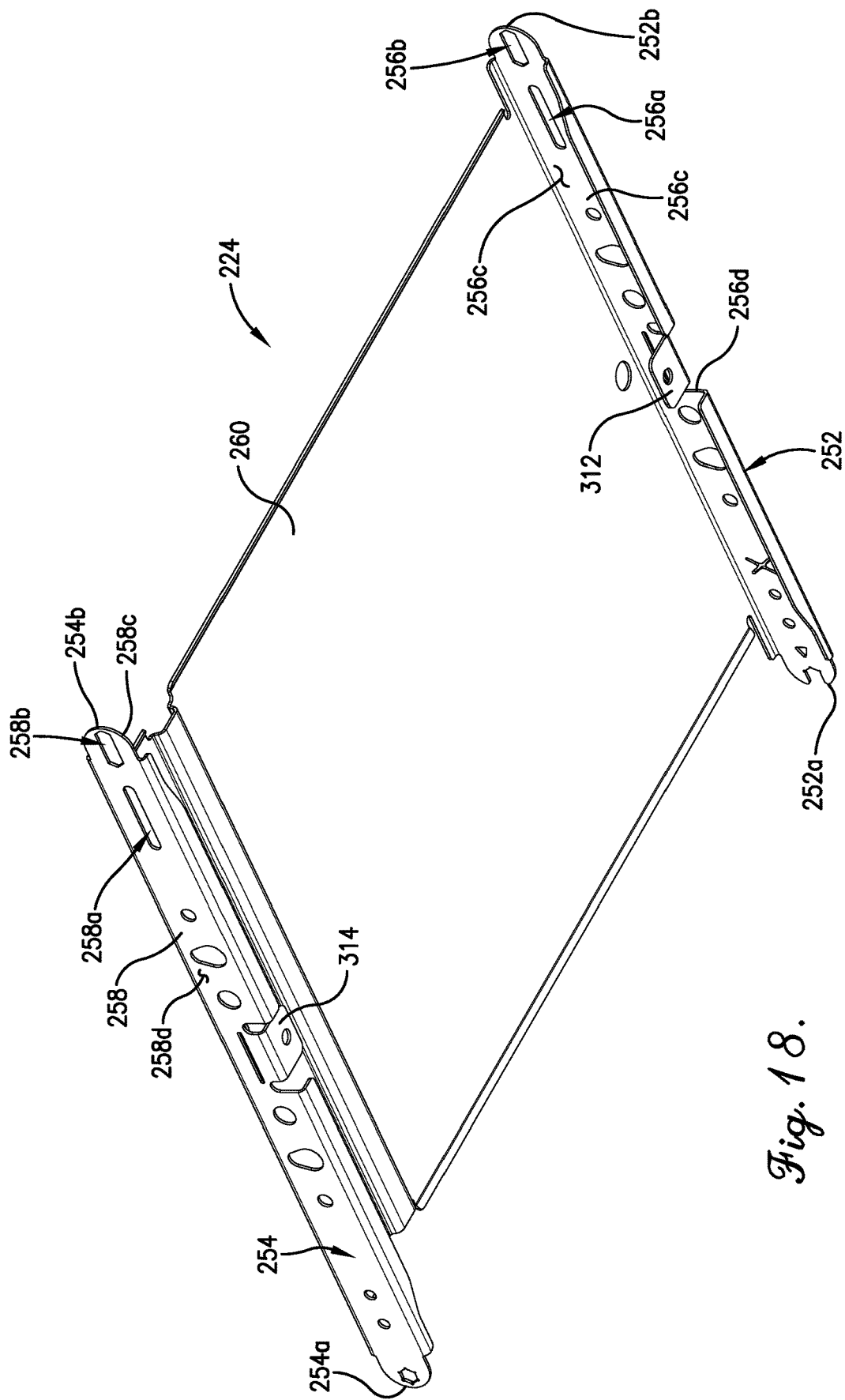
FIG. 18 is a bottom, rear perspective view of the chassis of FIG. 17.
Figure 19:
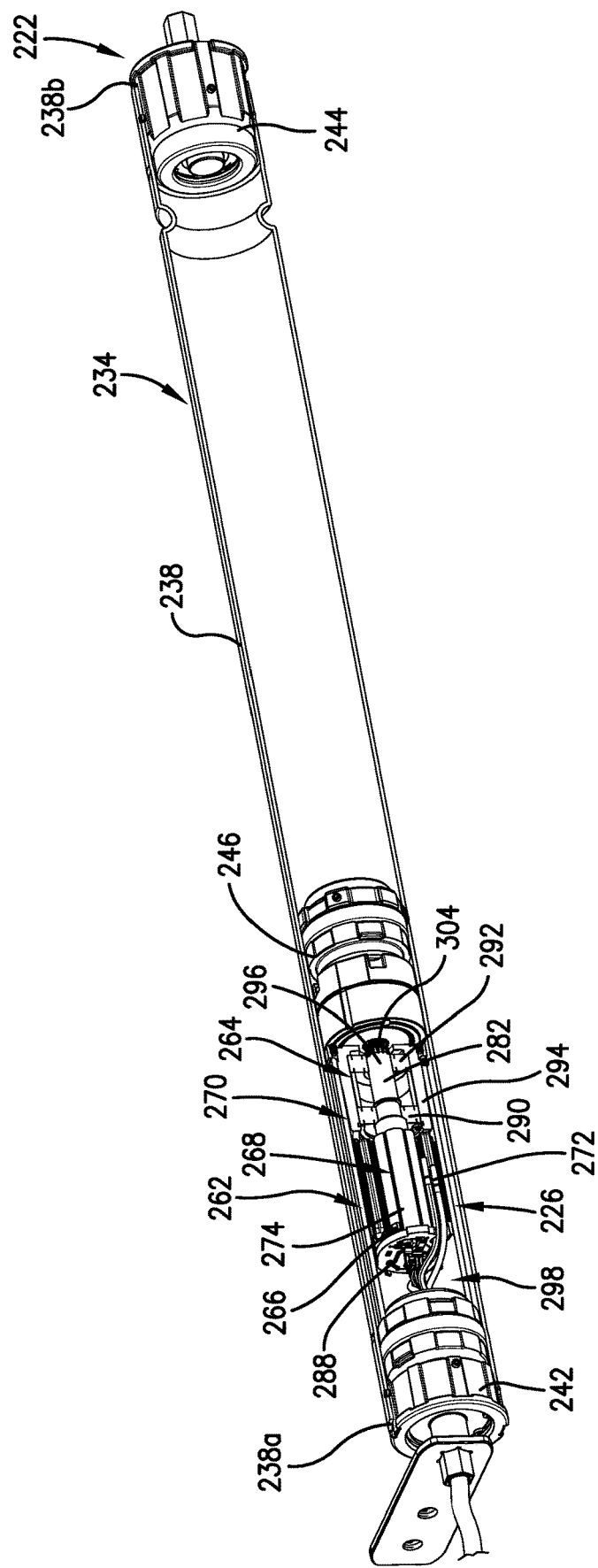
FIG. 19 is an enlarged, partially sectioned front perspective view of a portion of the conveyor assembly of FIGS. 10-16, particularly illustrating the power module.
Figure 20:
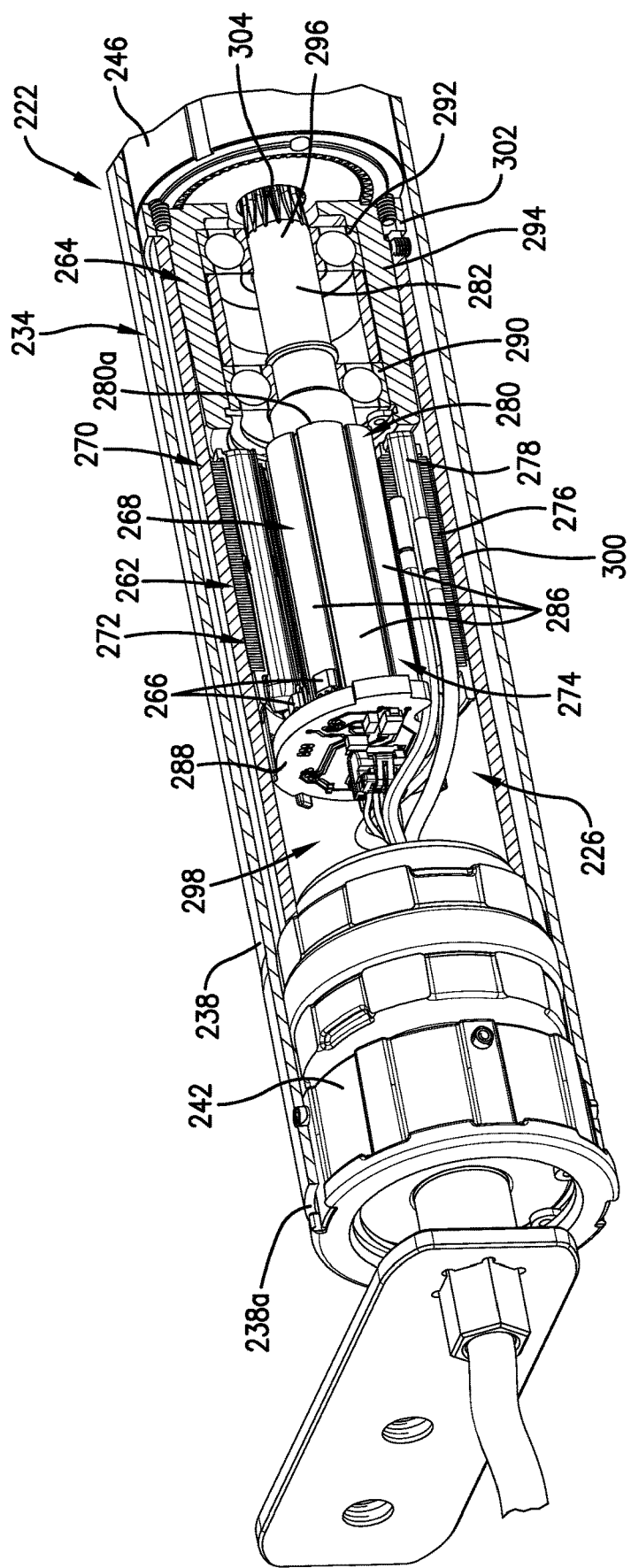
FIG. 20 is a further enlarged, partially sectioned front perspective view of a part of the portion of the conveyor assembly shown in FIG. 19, further illustrating the power module.
Figure 21:
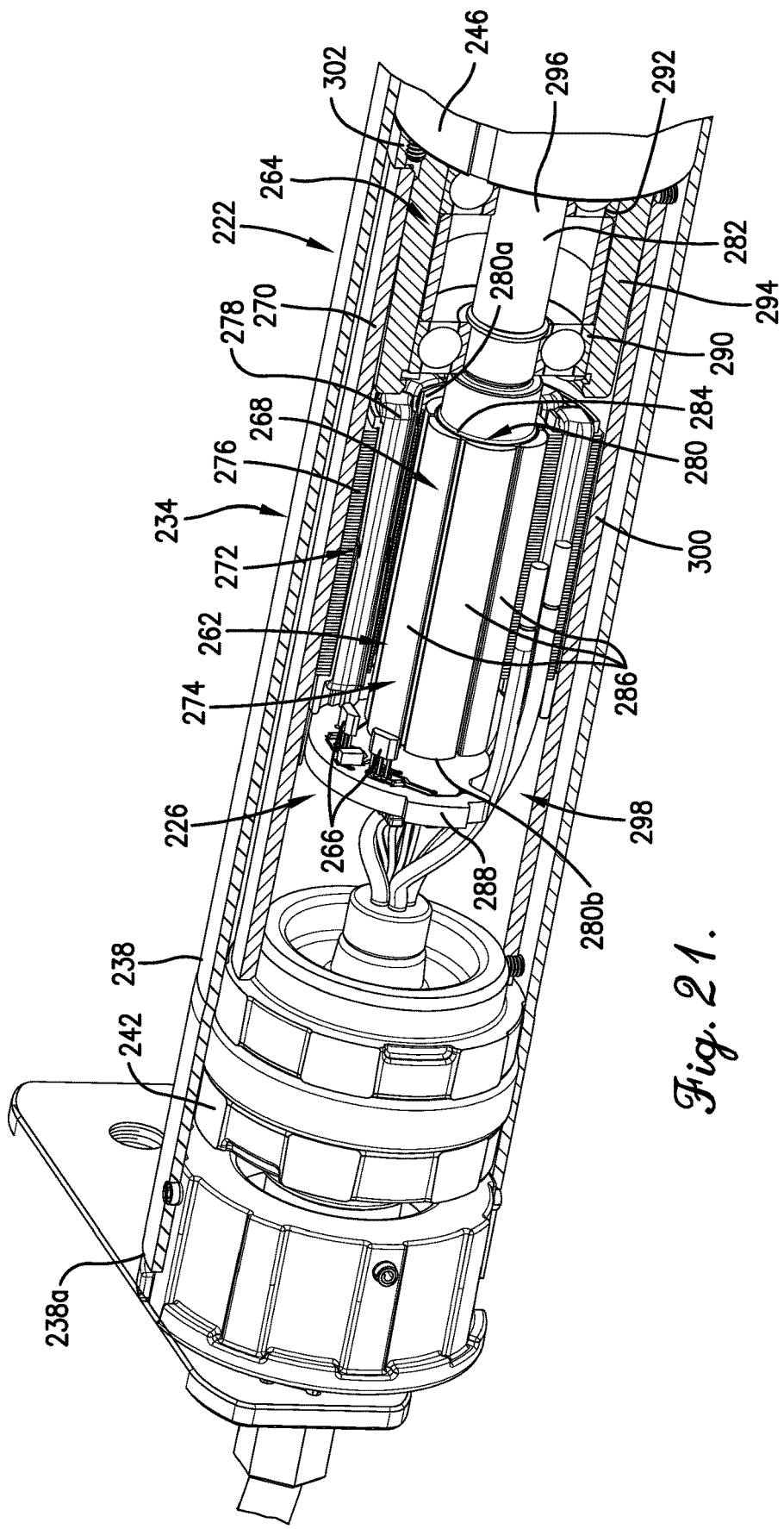
FIG. 21 is an alternative front perspective view of the part of the portion of the conveyor assembly shown in FIG. 10, also particularly illustrating the power module.
Figure 22:
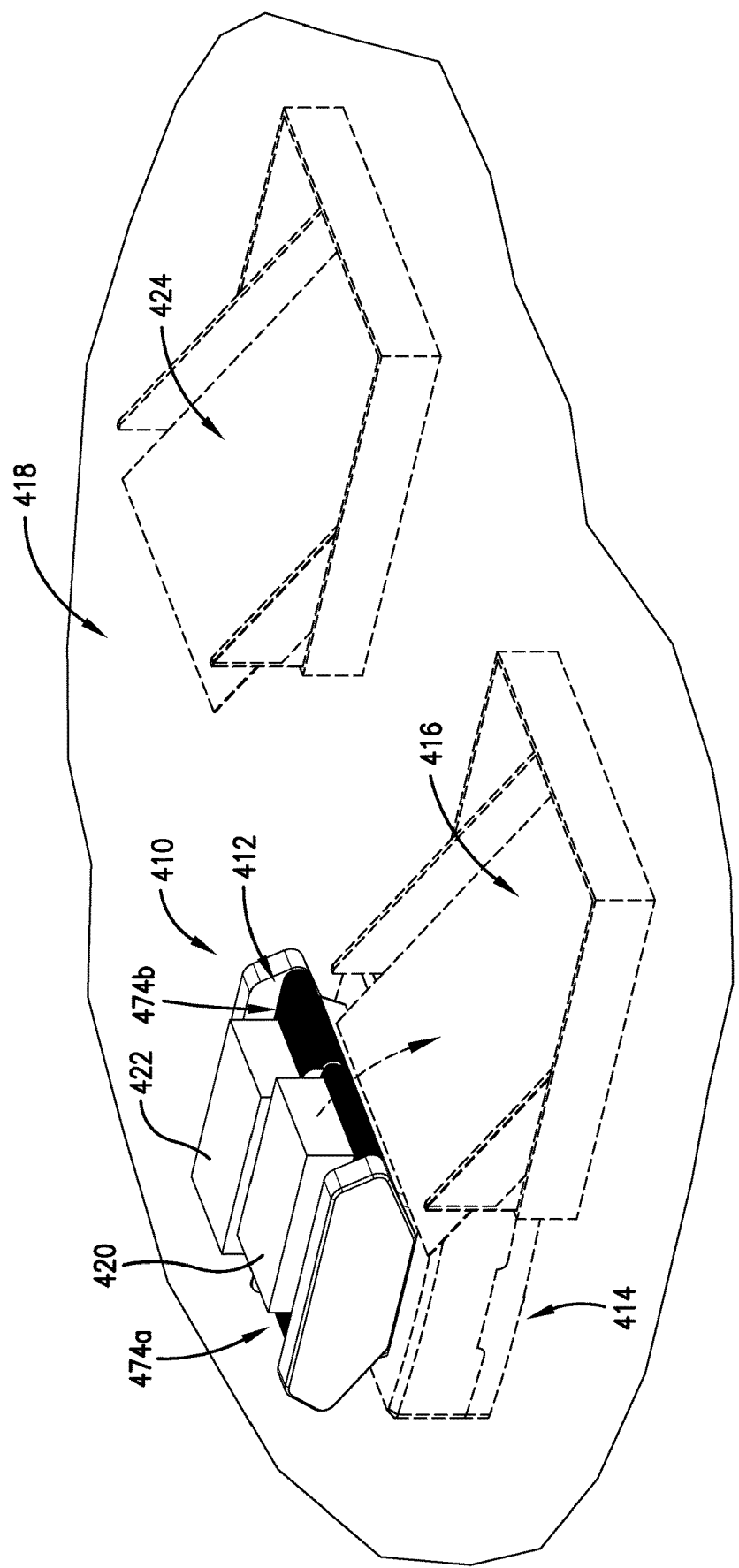
FIG. 22 is a front perspective view of a mobile conveyor system in accordance with a third preferred embodiment of the present invention, wherein the mobile conveyor system is shown in a package distribution environment featuring two distribution chutes, and wherein the mobile conveyor assembly includes a conveyor assembly and a vehicle supporting the conveyor assembly.
Figure 23:
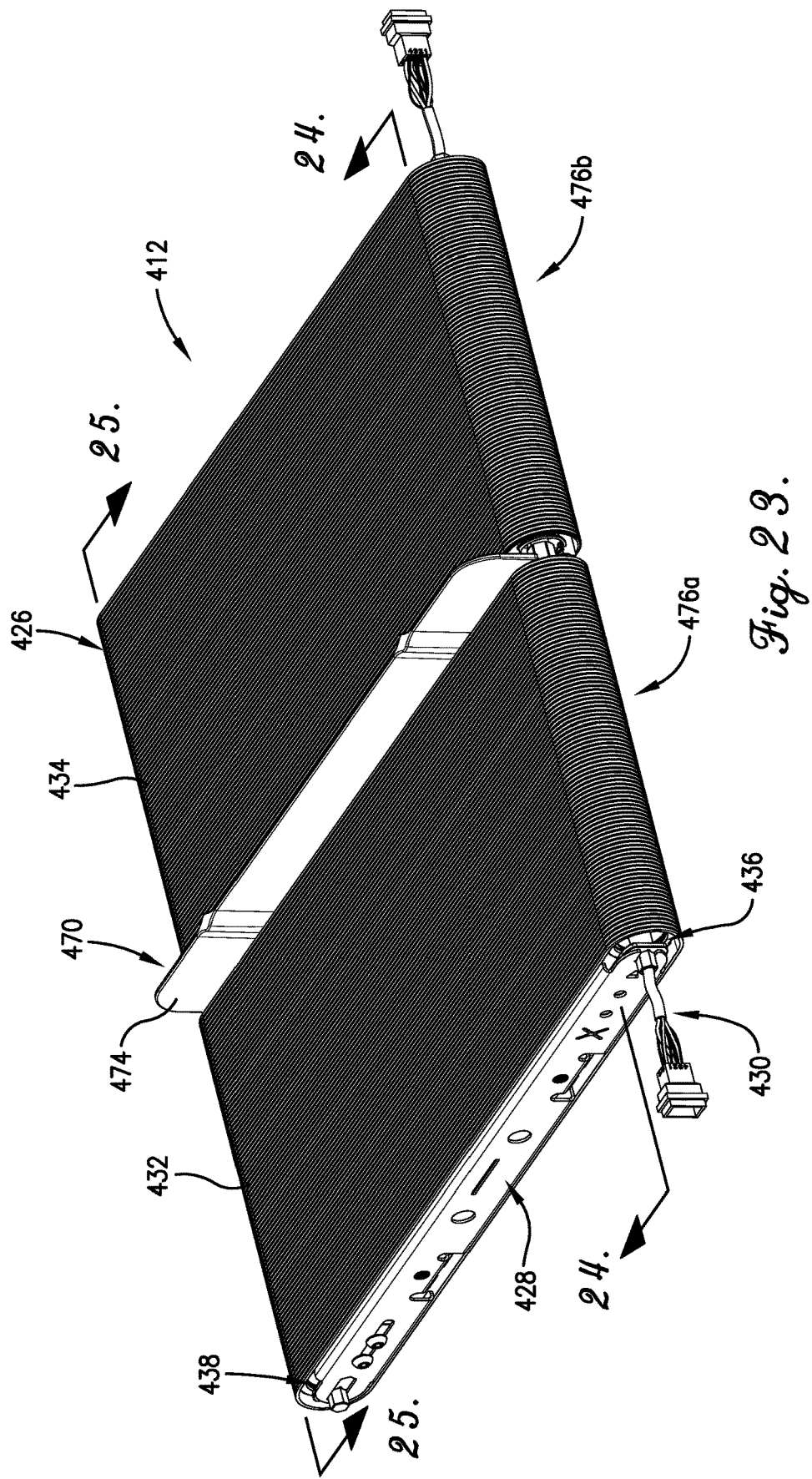
FIG. 23 is a front perspective view of the conveyor assembly of FIG. 22.
Figure 25:
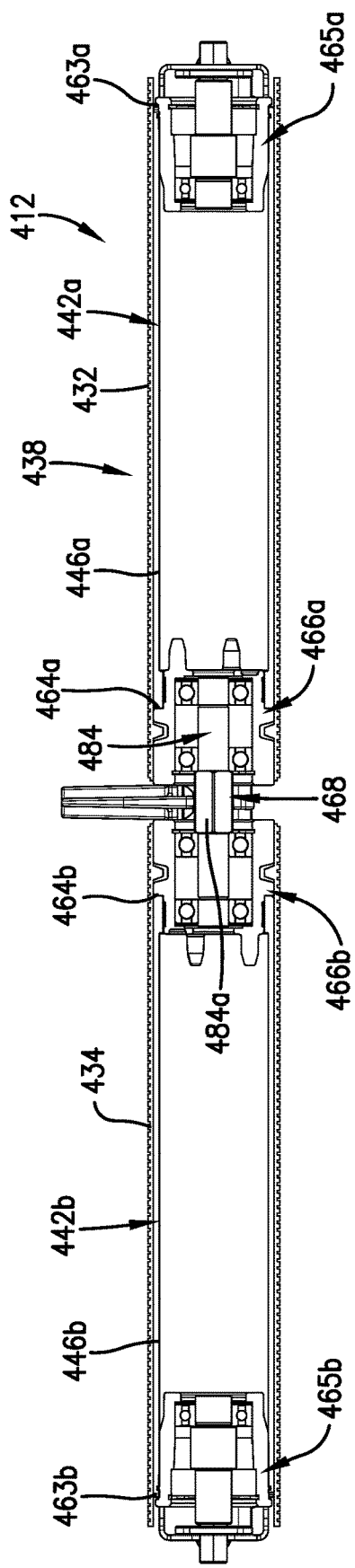
FIG. 25 is a partially sectioned rear elevational view of the passive roller assembly of the conveyor assembly of FIG. 23, taken along line 25-25 of FIG. 23.
Figure 25A:
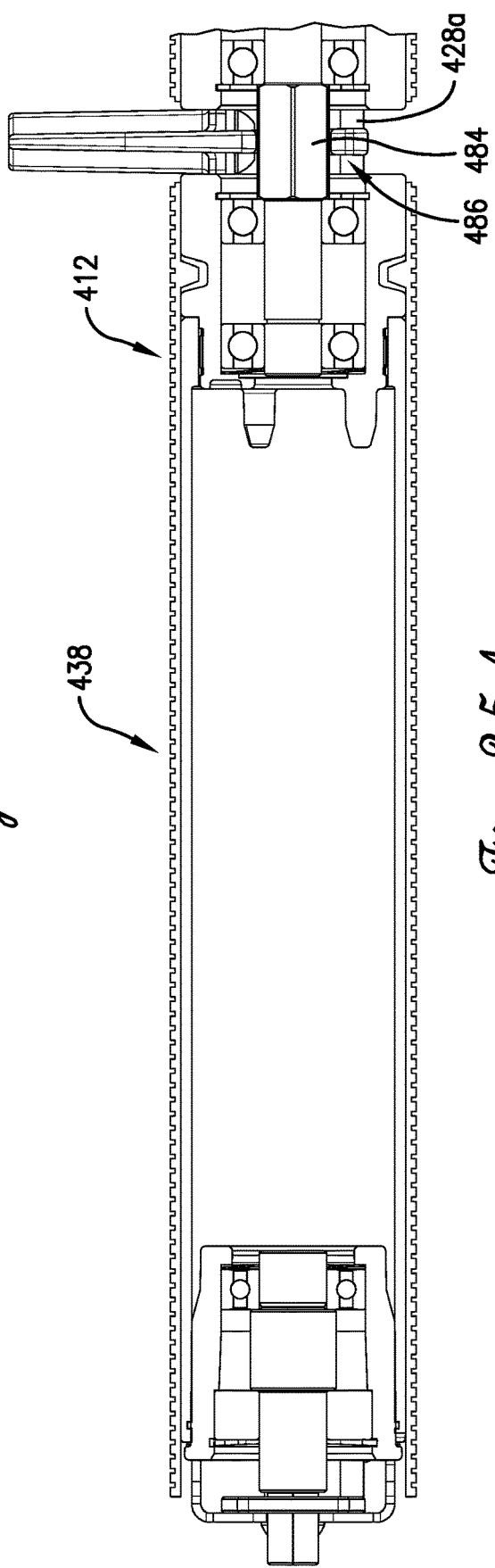
FIG. 25a is an enlarged view of a portion of the passive roller assembly as shown in FIG. 25.

As best shown in FIG. 16, each positioning fastener 346 is most preferably in the form of a threaded bolt, including a positioning head 346a and a threaded positioning shaft 346b. The positioning heads 346a are preferably at least in part cross-sectionally larger than the corresponding positioning shafts 346b, for reasons that will be discussed in greater detail below. Most preferably, the shafts 346b are generally cylindrical to present a shaft diameter. The heads 346a are preferably frustoconical to present a maximum head diameter adjacent the corresponding shafts 346b.

The positioning slots 256a and 258a preferably have heights corresponding to the diameters of the positioning shafts 346b such that vertical shifting of the positioning shafts 346b within the positioning slots 256a and 258a is at least substantially prohibited.

Each positioning head 346a preferably presents a tool-receiving recess 350 configured to receive a hex key (as illustrated), screw driver, or other tool used to rotate the positioning fastener 346.

The positioning shafts 346b of each pair of positioning fasteners 346 are configured to extend through the positioning slot 256a and 258a in the corresponding side rail 252 or 254 and threadably into respective ones of the fastener-receiving openings 338a, 338b, 340a, and 340b of the bracket bodies 338 and 340. As is conventional for such threaded engagement, rotation of the positioning shafts 346b results in lateral shifting thereof through the corresponding fastener-receiving openings 338a, 338b, 340a, and 340b such that each heads 346a moves laterally nearer to or farther from the corresponding sliding bracket 334 or 336.

More particularly, each head 346a presents a mating surface 352 extending perpendicularly relative to the corresponding side rail 252 or 254. Each sidewall 256 and 258 presents an inner face 256c or 258c, respectively, and an outer face 256d or 258d, respectively. Each sliding bracket 334 or 336 presents an inner face 334a or 336a, respectively, and an outer face 334b or 336b, respectively. Rotation of the positioning fasteners 346 of a given pair in a "tightening direction" (conventionally but not necessarily clockwise) when the threads of the positioning shafts 346b are engaged with those of the corresponding fastener-receiving openings 338a, 338b, 340a, and 340b results in lateral shifting of the mating surfaces 352 toward the corresponding outer faces 334b and 336b of the sliding brackets 334 and 336 until (1) the mating surfaces 352 of the heads 346a engage the outer faces 256d and 258d of the corresponding sidewalls 256 and 258, respectively, of the side rails 252 and 254 and (2) the outer faces 334b and 336b of the sliding brackets 334 and 336, respectively, engage the corresponding inner faces 256c and 258c of the sidewalls 256 and 258, respectively, of the side rails 252 and 254. That is, the side rail 252 is squeezed between the corresponding heads 346a and the sliding bracket 334. The side rail 254 is squeezed between the corresponding head 346a and the sliding bracket 336. In this secured or fixed state of the tensioning system 230, fore-aft shifting of the positioning fasteners 346 in the corresponding positioning slots 256a and 258a and, in turn, fore-aft shifting of the sliding brackets 334 and 336 relative to the corresponding side rails 252 and 254, is restricted or at least substantially prohibited.

In contrast, rotation of the positioning fasteners 346 of a given pair in a "loosening direction" (conventionally but not necessarily counterclockwise) when the threads of the positioning shafts 346b are engaged with those of the corresponding fastener-receiving openings 338a, 338b, 340a, and 340b results in lateral shifting of the mating surfaces 352 away from the corresponding outer faces 334b and 336b of the sliding brackets 334 and 336 to disengage and/or further shift the mating surfaces 352 of the heads 346a away from the outer faces 256d and 258d of the corresponding side rails 252 and 254, respectively. Any compression of the side rails 252 and 254 between the heads 346a and the sliding brackets 334 and 336, respectively, is thus decreased or eliminated. Sufficient decrease or elimination of compressive forces, such that the tensioning system 230 is in a shiftable state, facilities at least substantially unrestricted fore-aft shifting of the positioning fasteners 346 in the corresponding positioning slots 256a and 258a and, in turn, at least substantially unrestricted fore-aft shifting of the sliding brackets 334 and 336 relative to the corresponding side rails 252 and 254.

Alternatively stated, shifting of each sliding bracket 334 or 336 relative to the corresponding side rail 252 or 254 adjusts the position of the fastener-receiving openings 338a, 338b and 340a,340b relative to the corresponding positioning slot 256a or 258b.

Stated yet another way, the positioning fastener assemblies 342 and 344 are operable to selectively secure the respective brackets 334 and 336 to the respective side rails 252 and 254.

In a preferred embodiment, each of the positioning fasteners 346 is coated with an anti-loosening material such as a nylon thread locker patch. This coating restricts inadvertent loosening of the positioning fasteners 346 due to, for instance, vibration. It is noted that, at least in part due to such coating, provision of nuts, lock washers, or other auxiliary pieces to secure the positioning fasteners is unnecessary, further contributing to the advantageous simplicity of the present invention.

As noted previously, each sliding bracket 334 or 336 includes a respective one of the roller shaft openings (e.g., the roller shaft opening 340c of the bracket 336, with the corresponding roller shaft opening of the bracket 334 not being illustrated herein). Each sidewall 256 and 258 includes a respective one of the roller shaft slots 256b and 258b. The passive roller assembly 236 preferably includes roller shafts 354 and 356 extending laterally outwardly from corresponding ones of the inserts 248 and 250. Each roller shaft 354 and 356 extends through a corresponding one of the roller shaft openings (such as the opening 340c) to restrict fore-aft shifting of the passive roller assembly 236 relative to the sliding brackets 334 and 336. Furthermore, as will be discussed in greater detail below, the roller shafts 354 and 356 extend through corresponding ones of the roller shaft slots 256b and 258b so as to be selectively shiftable therein in the fore-aft direction.

More particularly, in a preferred embodiment and as illustrated, the roller shafts 354 and 356 are hexagonal in cross-section. The roller shaft openings (such as the roller shaft opening 340c of the bracket 336) are likewise hexagonal and sized and shaped to facilitate a close or tight fit about the roller shafts 354 and 356. Most preferably, reliefs 358 are provided at the corners of the openings (such as opening 340c) to facilitate proper fit. The roller shaft slots 256b and 258b preferably have heights corresponding to those of the corresponding roller shafts 354 and 356 such that vertical shifting of the roller shafts 354 and 356 within the roller shaft slots 256b and 258b is at least substantially prohibited.

As will be discussed in greater detail below, each roller shaft 354 and 356 includes an adjustment end 354a or 356a, respectively, projecting laterally outward beyond the corresponding side rail 252 or 254.

In view of the above, it will be apparent to those of ordinary skill in the art that the present invention facilitates efficient and secure adjustment of the tension of the conveyor belt 232. In a preferred method, for instance, the positioning fasteners 346 are initially loosened to enable sliding of the sliding brackets 334 and 336 relative to the side rails 252 and 254. An operator then grips at least one of the adjustment ends 354a or 356a (e.g., using a wrench) and shifts the passive roller assembly 236 in a fore or aft direction relative to the drive roller assembly 234 to, in turn, increase or decrease the tension of the conveyor belt 232 until the desired tension is achieved. (As discussed above, fore-aft shifting of the passive roller assembly 236 is accompanied by fore-aft shifting of the sliding brackets 334 and 336, which slide relative to the corresponding ones of the side rails 252 and 254.) The positioning fasteners 346 are then tightened such that the side rails 252 and 254 are secured between the corresponding mating surfaces 352 and sliding brackets 334 and 336. Fore-aft slipping of the passive roller assembly 236 is thereby restricted and conveyor belt tension is maintained, except as resulting from stretching of the conveyor belt 232 itself, if applicable. In some methods, for instance, it may be desirable to set the conveyor belt 232 to an over-high tension initially so as to achieve an acceptable tension after relaxation of the belt 232 has occurred.

It is particularly noted that the conveyor belt tension firmly holds the roller shafts 354 and 356 against the corresponding brackets 334 and 336, eliminating the need for any external clamps to hold the brackets 334 and 336.

Although the above described configuration of the tensioning system 230 is preferred, it is noted that a variety of modifications may be made without departing from the scope of some aspects of the present invention. For instance, either or both of the fastener-receiving slot and shaft slot might instead be defined by the sliding bracket. Similarly, either or both of the fastener-receiving openings and the shaft-receiving opening might be formed instead in the corresponding side rails. Alternative shapes of the roller shaft are permissible according to some aspects of the present invention, as are modified forms of the adjustment end thereof. The heads of the positioning fasteners might also be alternatively shaped.

Conveyor System—Third Embodiment—Dual Conveyor with Dually Powered and Dually Passive Roller Assemblies A third preferred conveyor system is illustrated in FIGS. 22-28. It is initially noted that, with certain exceptions to be discussed in detail below, many of the elements of the conveyor system 410 of the third embodiment are the same as or very similar to those described in detail above in relation to the conveyor system 10 of the first embodiment and the conveyor system 210 of the second embodiment. Therefore, for the sake of brevity and clarity, redundant descriptions and numbering will be generally avoided here. Unless otherwise specified, the detailed descriptions of the elements presented above with respect to the first and second embodiments should therefore be understood to apply at least generally to the third embodiment, as well.

Similarly to the conveyor system 10 and the conveyor system 210, the conveyor system 410 of the third preferred embodiment preferably comprises a conveyor assembly 412 and a vehicle 414 (shown schematically in hidden line).

The vehicle 414 is preferably moveable to facilitate positioning/repositioning of the conveyor system 410 as a whole and, consequently, of the conveyor assembly 412. In the illustrated embodiment, for instance, the vehicle 414 has positioned the conveyor assembly 412 adjacent a first chute 416 in a package distribution center 418 to enable transfer of a first package 420 from the conveyor assembly 412 to the first chute 416. A second package 422, also supported on the conveyor assembly 412, is not transferred to the first chute 416 and might instead be subsequently offloaded into a second, separate chute 424.

As discussed above with regard to the first and second preferred embodiments, movement of the vehicle 414 is most preferably automated, with the vehicle 414 being an autonomous guided vehicle (AGV) or robot. However, as also discussed above, the vehicle might in alternate embodiments be differently configured or omitted entirely. For instance, the conveyor system might alternatively be mounted to a manually rollable cart, used in a fixed position, etc.

In a preferred embodiment, the conveyor assembly 412 broadly includes a conveyor module 426, a chassis 428, and a power module 430.

The conveyor module 426 preferably includes a pair of independent conveyor belts 432 and 434, a dually powered roller assembly 436, and a passive roller assembly 438. The roller assemblies 436 and 438 are preferably spaced from one another in a fore-aft direction or, alternatively stated, along a longitudinal/fore-aft axis of the conveyor module 426.

As will be discussed in greater detail below, the dually powered roller assembly 436 preferably includes first and second axial sections 440a and 440b. Similarly, the passive roller assembly 438 preferably includes first and second axial sections 442a and 442b.

The conveyor belt 432 preferably extends along the longitudinal or fore-aft axis to form a single, continuous (i.e., endless) loop around the first axial sections 440a and 442a of the roller assemblies 436 and 438, respectively. Similarly, the conveyor belt 434 preferably extends along the longitudinal or fore-aft axis to form a single, continuous (i.e., endless) loop around the second axial sections 440b and 442b of the roller assemblies 436 and 438, respectively.

Although continuously extending, unitarily belts 432 and 434 are illustrated, it is noted that it is permissible according to some aspects of the present invention for each belt to itself include a plurality of mini-belts, roller segments, ball bearings, plates, slats, chains, lines, or other components that collectively or collaboratively present an item-supporting surface and function in a scrolling manner as noted above. It is also noted that it is permissible according to some aspects of the present invention for scrolling belts to be omitted in a conventional sense, with transport of goods being achieved in part through use of components positioned between the fore and aft roller assemblies (and not looping thereabout). Although the above examples are not exhaustive, the wide variety of applicable material handling/transport technologies to which the present invention may be applied will be readily apparent to those of ordinary skill in the art.

The dually powered roller assembly 436 includes a pair of drive or powered roller bodies 444a and 444b rotatable about a first or drive roller axis. The passive roller assembly 438 includes a pair of passive roller bodies 446a and 446b rotatable about a second or passive roller axis.

Each of the drive roller bodies 444a and 444b is preferably tubular or cylindrical in form. The drive roller bodies 444a and 444b present respective laterally outer ends 448a and 448b, The drive roller bodies 444a and 444b further present respective laterally inner ends 450a and 450b.

Respective pairs of bearing adapters or roller inserts 452a and 452b are preferably in part received within and secured relative to respective ones of the laterally outer ends 448a and 448b.

Respective couplers 454a and 454b of a dually powered roller coupling assembly 456, which will be described in greater detail below, are cooperatively received at least in part within and secured relative to each of the laterally inner ends 450a and 450b so as to extend axially from the respective roller bodies 444a and 444b.

The power module 430 preferably includes a pair of motor assemblies 458a and 458b, each of which is at least substantially disposed within a respective one of the drive roller bodies 444a and 444b, between the lateral ends 448a and 450a or 448b and 450b, respectively. The motor assembly 458a preferably provides power to the drive roller body 444a. The motor assembly 458b preferably provides power to the drive roller body 444b.

The motor assembly 458a preferably broadly includes a motor 459a, a bearing assembly 460a, a gear assembly 461a, and a motor output shaft 462a. The motor assembly 458b preferably broadly includes a motor 459b, a bearing assembly 460b, a gear assembly 461b, and a motor output shaft 462b.

As noted previously, the passive roller assembly 438 preferably includes the pair of passive roller bodies 446a and 446b rotatable about the second or passive roller axis. Each of the passive roller bodies 446a and 446b is preferably tubular or cylindrical in form. The passive roller bodies 446a and 446b present respective laterally outer ends 463a and 463b. The passive roller bodies 446a and 446b further present respective laterally inner ends 464a and 464b.

Respective pairs of bearing adapters or roller inserts 465a and 465b are preferably in part received within and secured relative to respective ones of the laterally outer ends 463a and 463b.

Respective couplers 466a and 466b of a passive roller coupling assembly 468, which will be described in greater detail below, are cooperatively received at least in part within and secured relative to each of the laterally inner ends 464a and 464b.

In contrast to the dually powered roller assembly 436, no motor assembly or assemblies are provided within or directly associated with the passive roller bodies 446a and 446b. That is, the power module 430 is associated only with the dually powered roller assembly 436.

The chassis 428 preferably includes only a single, unitary slider bed and only a single pair of laterally spaced apart sidewalls extending upward from the slider bed. That is, a first sidewall is disposed laterally outward of the conveyor belt 432, and a second sidewall is disposed laterally outward of the conveyor belt 434. No sidewall or sidewalls are formed by the chassis 428 between the belts 432 and 434. (Alternatively stated, the first and second sidewalls are disposed laterally outward of respective ones of the laterally outer ends 463a and 463b. No sidewall or sidewalls are formed by the chassis 428 adjacent the laterally inner ends 464a and 464b.)

The slider bed and the sidewalls are most preferably integrally formed, although discrete formation falls within the scope of some aspects of the present invention.

Preferably, the chassis 428 further includes a spaced apart pair of fore and aft stiffening brackets, each of which laterally spans both lateral halves of the conveyor assembly 412. Still further, each of the stiffening brackets is preferably fitted with a pair of laterally spaced apart foam inserts, each of which provides support to components of one lateral half of the conveyor assembly 412. Alternative stiffening and/or dampening approaches fall within the scope of some aspects of the present invention, however.

The chassis 428 also preferably includes a fore-aft extending, laterally centrally positioned support bracket 428a.

It is noted that alternative chassis configurations, including but not limited to modifications to the bed, sidewalls, and brackets described above, are within the ambit of some aspects of the present invention.

A divider 470 including an upwardly projecting divider plate 474 is preferably secured to the chassis 428 to extend longitudinally in a fore-aft direction. The divider 470 is disposed laterally between the conveyor belts 432 and 434 such that the conveyor belts 432 and 434 preferably do not contact each other. The divider 470 is also configured to help separate items carried on the respective conveyor belts 432 and 434.

The divider 470 may be secured by a variety of means, including but not limited to threaded fasteners, latches, or pegs. Most preferably, the selected securement means facilitate efficient removal and reinstallation of the divider 470 to respectively enable or restrict packages or other goods being conveyed from resting on both belts 432 and 434. However, it also permissible for the connection means to be permanent or semi-permanent in nature (i.e., designed to be removable but not rapidly so). It also is permissible according to some aspects of the present invention for the divider to be omitted entirely or alternatively configured in some other manner.

In view of the above, the conveyor assembly 412 can be understood to include two side-by-side subassemblies 476a and 476b. The first subassembly 476a includes the powered roller body 444a, the passive roller body 446a, the conveyor belt 432, the motor assembly 458a, the bearing inserts 452a and 465a, and the couplers 454a and 466a. The second subassembly 476b includes the powered roller body 444b, the passive roller body 446b, the conveyor belt 434, the motor assembly 458b, the bearing inserts 452b and 465b, and the couplers 454b and 466b.

In a preferred embodiment, and as will be discussed in greater detail below, each of the couplers 454a and 454b of the dually powered roller coupling assembly 456 and each of the couplers 466a and 466b of the passive roller coupling assembly 468 functions as a combined torque transmission coupler and bearing cartridge.

It is noted that the couplers 454a, 454b, 466a, and 466b (and more broadly, the coupling assemblies 456 and 468) are preferably identical to one another. Thus, for the sake of simplicity and clarity, only the coupler 454a, illustrated in detail in FIGS. 27 and 28, will be described in depth herein. However, it should be understood that the details provided herein with regard to the coupler 454a preferably apply to the remaining couplers 454b, 466a, and 466b, as well.

Turning now to FIGS. 27 and 28, the coupler 454a includes a respective laterally outermost torque transmission portion 478 and a laterally inner bearing portion 480. It is permissible according to some aspects of the present invention, however, for separate torque transmission couplers and bearing portions to be used, or for coupling to be achieved by one or more of a variety of other techniques.

The torque transmission portion 478 preferably includes a plurality of arcuately spaced apart stub shafts or pins 478a configured to be received in corresponding ones of a first set of openings 479a formed in a torque ring 479.

The bearing portion 480 preferably includes pair of bearings 480a. The bearings 480a are preferably ball bearing assemblies, but alternative bearings (e.g., journal, roller, etc.) are permissible. Furthermore, although two bearings 480a are illustrated, more or fewer bearings may be provided without departing from the scope of some aspects of the present invention.

The coupling assembly 456 also includes a connector shaft 482 extending between and interconnecting the couplers 454a and 454b. Likewise, the coupling assembly 468 includes a connector shaft 484 extending between and interconnecting the couplers 466a and 466b. As will be discussed in greater detail below, the connector shafts 482 and 484 are not intended to rotate, instead providing a stationary or at least substantially stationary link between the rotatable couplers 454a and 454b and the rotatable couplers 466a and 466b, respectively.

Each shaft 482 and 484 includes a polygonal portion 482a or 484a, respectively. The support bracket 428a of the chassis 428 preferably defines fore and aft seats 486 corresponding to the polygonal portions 482a and 484a. More particularly, each polygonal portion 482a or 484a is configured to be in part received in, rest on, or "float" above a corresponding one of the seats 486. It is noted that the polygonal portions 482a and 484a are preferably hexagonal in form but permissibly any one of a variety of polygonal or rotation resistant shapes, including but not limited to eccentric shapes or keyed shapes.

A motor shaft connector 488 is also provided. The motor shaft connector 488 includes an opening 488a for receiving a laterally inner end of the motor shaft 462a projecting from the gear assembly 461a of the motor assembly 458a. The motor shaft connector 488 further preferably includes a plurality of arcuately spaced apart stub shafts or pins 488b configured to be received in corresponding ones of a second set of openings 479b formed in the torque ring 479. (As illustrated, the first set of openings 479a is preferably arcuately offset from the second set of openings 479b, such that the openings of the sets 479a and 479b alternate arcuately with one another.)

The torque ring 479 is disposed laterally between the motor shaft connector 488 and the coupler 454a. Most preferably, the torque ring 479 comprises an elastomeric material, although any one or more of a variety of materials fall within the scope of some aspects of the present invention.

As will be apparent to those of ordinary skill in the art, rotation of the motor shaft of the motor assembly 458a is transferred from the motor shaft to the motor shaft connector 488, and thereafter through the torque ring 479 to the torque transmission portion 478 of the coupler 454a.

Preferably, a portion of the coupler 454a is inserted into the inner end 450a of the roller body 444a via a press fit with the aid of a tolerance ring 490. The tolerance ring 490 preferably presents arcuately spaced apart ends to facilitate installment of the tolerance ring 490 about the body of the coupler 454a. The tolerance ring 490 further preferably includes a plurality of radially outwardly projecting, deformable ribs for engaging an inner surface of the roller body 444a at the inner end 450a. Engagement of the coupler 454a with the roller body 444a ultimately results in transfer of rotation of the motor shaft to the roller body 444a.

It is noted that other fitment approaches such as welding, fasteners connected between the roller body and the coupler, etc. fall within the scope of some aspects of the present invention, as well, and may be used instead of or in addition to tolerance rings.

It is also permissible according to some aspects of the present invention for the coupler to be received in its entirety within the respective roller body or to be located in its entirety external to or outside the respective roller body.

In view of the above, it will be apparent to those of ordinary skill in the art that, provided that any bearing friction is reasonably low, torque generated by each of the subassemblies 476a and 476b is not transmitted to the other of the subassemblies 476a and 476b, or such transmission is negligible. That is, movement of parts of one subassembly 476a or 476b does not influence or affect movement of parts of the other subassembly 476a or 476b. Thus, as will be discussed in greater detail below, the conveyor belts 432 and 434 are fully independently driven and therefore can shift independently of one another.

As will also be apparent to those of ordinary skill in the art, it is intended that the shaft 482 be rotationally isolated from and therefore not transfer rotation between the roller bodies 444a and 444b (or the couplers 454a and 454b) by merit of the previously described design of the couplers 454a and 454b, in which the bearings 480a support the shaft 482. Likewise, it is intended that the shaft 484 be rotationally isolated from and therefore not transfer rotation between the roller bodies 446a and 446b (or the couplers 466a and 466b) by merit of the design of the couplers 466a and 466b, in which the bearings thereof support the shaft 484.

Alternatively stated, the powered roller bodies 444a and 444b are interconnected to each other in such a manner as to share a first rotational axis yet be at least substantially rotationally independent of each other, such that each of the powered roller bodies 444a and 444b can rotate without causing or interfering with rotation of the other of the powered roller bodies 444a and 444b. The passive roller bodes 446a and 446b are likewise rotational independent of one another.

Preferably, the coupler 454a includes a belt guide 492 defined by the bearing portion 480. The belt guide 492 is preferably in the form of a groove 492a corresponding to a projection 494 on the conveyor belt 432. (A projection 496 is similarly formed on the conveyor belt 434.) The belt guide 492 preferably facilitates enhanced tracking of the belt 432, as well as enabling an increased belt width.

The groove 492a is preferably cast in the bearing portion 480, although other methods of formation fall within the scope of some aspects of the present invention. The groove might also be omitted without departing from the scope of some aspects of the present invention.

As noted previously, the couplers 454a, 454b, 466a, and 466b are all preferably identical to one another. However, it is noted that only the couplers 454a and 454b are associated with respective torque rings (such as the torque ring 479) and motor shaft connectors (such as the motor shaft connector 488). The couplers 466a and 466b, as a result of their placement in the fully passive roller assembly 438, are not associated with such motor-related components. Thus, the couplers of the passive roller assembly might, without departing from the scope of the present invention, be designed differently than those associated with the fully powered roller assembly. Among other things, for instance, the (nonfunctional) pins of the torque transmission portions might be omitted. However, despite the "over-design" of the couplers 466a and 466b of the fully passive roller assembly 438 of the illustrated embodiment, use of a single coupler design in all four (4) instances provides advantages including but not limited to manufacturing or sourcing simplicity and assembly simplicity (e.g., by reducing the types of different parts required for assembly).

The conveyor system 410 described above is highly advantageous. In a distribution center, for instance, a conventional single-belt conveyor assembly supported by an automated vehicle might typically only transport a single package per trip from a loading area to a distribution zone in which the package is dispatched at an appropriate location (e.g., a pre-specified chute). In contrast, with reference to FIG. 22, the automated vehicle 414 might be loaded at the loading area with the first package 420 on the belt 432 and the second package 422 on the belt 434. The automated vehicle 414 might then transport the conveyor assembly 412 to the first chute 416, at which time operation of only the first conveyor subassembly 476a (and thus movement of only the first belt 432) might occur into order to offload the first package 420 into the first chute 416. After the vehicle 414 repositions itself adjacent the second chute 424, operation of the second conveyor subassembly 474b, in order to rotate the second belt 434 and thus shift the second package 422, might occur to offload the second package 422 into the second chute 424.

Furthermore, as shown in FIG. 26, the conveyor assembly 412 can, if desired, additionally function much like a conventional single-belt conveyor to facilitate transport and shifting of larger packages that cannot be or preferably are not shifted by a single one of the belts 432 and 434. In such an instance, removal of the divider 470 (if previously present) enables a package to rest simultaneously on both belts 432 and 434. Concurrent operation of the motor assemblies 458a and 458b so as to move the belts 432 and 434 in a single direction and at equal speed then facilitates shifting of the package as desired.

Still further, it is noted that provision of two (2) "combination" couplers 454a and 454b, each integrating both a torque transmission portion and a bearing portion (as illustrated with regard to the coupler 454a via provision of a torque transmission portion 478 and a bearing portion 480), decreases the axial length required to achieve the same functionality that might otherwise be achieved in a dually powered roller using two (2) sets of separate torque transmission couplers and bearing cartridges. Thus, such "combination" couplers 454a and 454b enable an equivalent functional conveyor belt total width (i.e., a sum of the widths of the belts 432 and 434) to be achieved in a smaller total conveyor assembly width.

It is also noted that, in contrast with two (2) independent conveyor systems, the conveyor system 410 of the present invention achieves reduced weight due to reduced mounting complexity. More particularly, two (2) independent conveyor systems would require four (4) sets of mounting hardware, whereas the conveyor system 410 requires only two (2) sets of mounting hardware. This reduction in mounting hardware needs also advantageously reduces the associated bill of materials (BOM).

Finally, it is noted that expansion of the conveyor system 410 to include additional subassemblies (i.e., additional conveyor belts, etc.) falls within the scope of some aspects of the present invention.

Conveyor System—Fourth Embodiment—Dual Conveyor with Combined Powered/Passive Roller Assemblies A fourth preferred conveyor system is illustrated in FIGS. 29 and 30. It is initially noted that, with certain exceptions to be discussed in detail below, many of the elements of the conveyor system 510 of the fourth embodiment are the same as or very similar to those described in detail above in relation to the conveyor system 10 of the first embodiment, the conveyor system 210 of the second embodiment, and the conveyor system 410 of the third embodiment. Therefore, for the sake of brevity and clarity, redundant descriptions and numbering will be generally avoided here. Unless otherwise specified, the detailed descriptions of the elements presented above with respect to the first through third embodiments should therefore be understood to apply at least generally to the fourth embodiment, as well.

Similarly to the conveyor systems 10, 210, and 410, the conveyor system 510 of the fourth preferred embodiment preferably comprises a conveyor assembly 512 and a vehicle (not shown). The vehicle is preferably moveable to facilitate positioning/repositioning of the conveyor system 510 as a whole and, consequently, of the conveyor assembly 512.

In a preferred embodiment, the conveyor assembly 512 broadly includes a conveyor module 514, a chassis 516, and a power module 518.

The conveyor module 514 preferably includes a pair of independent conveyor belts 520 and 522 and a pair of structurally identical but oppositely oriented partially powered roller assemblies 524 and 526. The roller assemblies 524 and 526 are preferably spaced from one another in a fore-aft direction or, alternatively stated, along a longitudinal/fore-aft axis of the conveyor module 514.

Furthermore, the roller assemblies 524 and 526 are preferably oppositely oriented. More particularly, the partially powered roller assembly 524 preferably includes powered and passive axial sections 524a and 524b. Similarly, the partially powered roller assembly 526 preferably includes powered and passive axial sections 526a and 526b. The conveyor belt 520 preferably extends along the longitudinal or fore-aft axis to form a single, continuous (i.e., endless) loop around the powered axial section 524a and the passive axial section 526b. Similarly, the conveyor belt 522 preferably extends along the longitudinal or fore-aft axis to form a single, continuous (i.e., endless) loop around the passive axial section 524b and the powered axial section 526a.

For conciseness and clarity, only the partially powered roller assembly 524 is illustrated and described in detail herein. However, as noted above, the partially powered roller assembly 526 is preferably identical (but oppositely oriented) to the partially powered roller assembly 524. Thus, descriptions provided herein with reference to the partially powered roller assembly 524 should be understood to apply to the partially powered roller assembly 526, as well.

Turning now to FIG. 28, similarly to the corresponding components of the previously described embodiments, each of the axial sections 524a and 524b of the partially powered roller assembly 524 includes a corresponding roller body 528a or 528b. Furthermore, each roller body 528a and 528b receives a corresponding bearing adapter or roller insert 530a or 530b. Still further, a coupling assembly 532, including couplers 534a and 534b and a connector shaft 536, preferably connects the powered and passive axial sections 524a and 524b.

The couplers 534a and 534b are preferably each configured as described above with regard to the coupler 454a (and are thus likewise configured at least substantially identically to the couplers 454b, 466a, and 466b). Furthermore, the coupler 534a of the powered axial section 524a is preferably associated with a torque ring 579 (configured as described above with respect to the torque ring 479) and a motor shaft connector 581 (configured as described above with respect to the motor shaft connector 488). In contrast, the coupler 534b, associated with the passive axial section 524b, is not associated with a torque ring or motor shaft connector. Thus, certain of the features of the illustrated coupler 534b, such as the pins of the torque transmission portion thereof, are not strictly necessary to its functionality and may be omitted without departing from the scope of some aspects of the present invention.

The power module 518 preferably includes a motor assembly 538 at least substantially disposed within the roller body 528a (as well as corresponding motor assembly associated with the partially powered roller assembly 526).

A divider 540 is preferably provided, as discussed above with respect to the conveyor system 410 of the third embodiment.

In view of the above, the conveyor assembly 512 can be understood to include two identical but oppositely oriented side-by-side subassemblies 542a and 542b. The first subassembly 542a includes the powered roller body 528a, the passive roller body (not labeled) of the roller assembly 526, the conveyor belt 520, the motor assembly 538, the bearing insert 530a and the bearing insert (not labeled) of the passive section 526b roller assembly 526, and the coupler 534a and the coupler (not labeled) of the passive section 526b of the roller assembly 526. The second subassembly 542b includes the passive roller body 528b, the powered roller body (not labeled) of the roller assembly 526, the conveyor belt 522, the motor assembly (not labeled) of the roller assembly 526, the bearing insert 530b and the bearing insert (not labeled) of the powered section 526a of the roller assembly 526, and the coupler 534b and the coupler (not labeled) of the powered section 526a roller assembly 526.

Furthermore, as discussed above with regard to the conveyor system 410 of the third preferred embodiment, provided that any bearing friction is reasonably low, torque generated by each of the subassemblies 542a and 542b is not transmitted to the other of the subassemblies 542a and 542b, or such transmission is negligible. That is, movement of parts of one subassembly 542a or 542b does not influence or affect movement of parts of the other subassembly 542a or 542b.

The conveyor system 510 described above is highly advantageous, including each of the advantages discussed above with regard to the conveyor system 410 of the third embodiment. However, the conveyor system 510 is additionally advantageous in that the two roller assemblies 524 and 526 are identical to each other and are simply "flipped" relative to one another for assembly of the conveyor assembly 512. That is, whereas the conveyor system 510 of the third embodiment requires manufacture or purchase of two completely differently configured (i.e., one dually powered and one fully passive) roller assemblies 436 and 438, the conveyor system 510 of the fourth embodiment simply requires manufacture or purchase of two identical roller assemblies 524 and 526.

Figure 32:
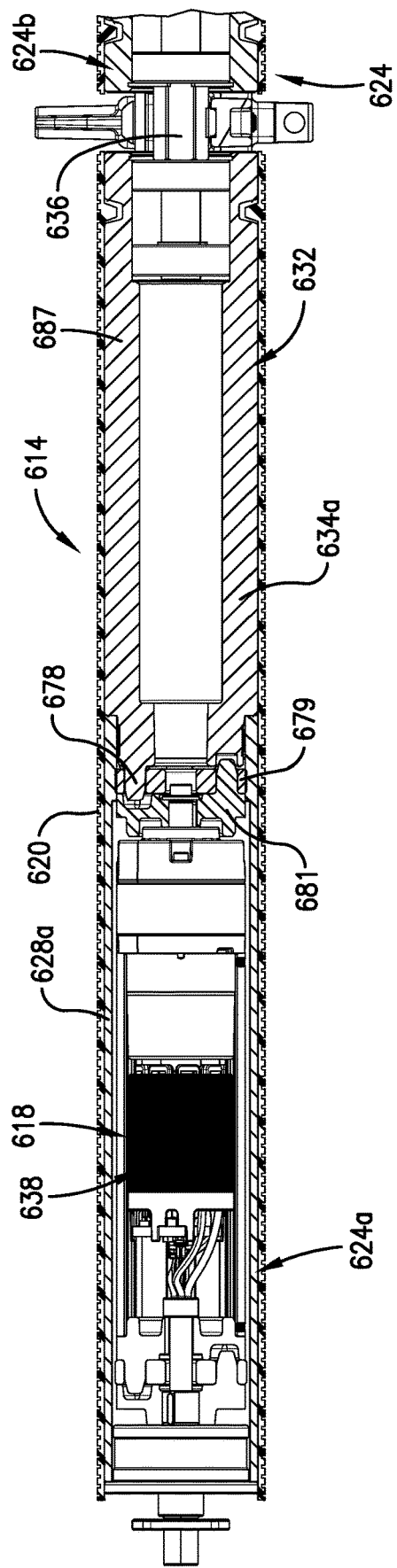
FIG. 32 is an enlarged view of a portion of the partially powered roller assembly as shown in FIG. 31.

Conveyor System—Fifth Embodiment—Dual Conveyor with Alternative Combined Powered/Passive Rollers A roller assembly for a fifth preferred conveyor system is illustrated in FIGS. 31 and 32. It is initially noted that, with certain exceptions to be discussed in detail below, many of the elements of the conveyor system 610 of the fourth embodiment are the same as or very similar to those described in detail above in relation to the conveyor system 10 of the first embodiment, the conveyor system 210 of the second embodiment, the conveyor system 410 of the third embodiment, and the conveyor system 510 of the fourth embodiment. As will be apparent from the below description, the conveyor system 610 of the fifth embodiment is particularly similar in many regards to the conveyor system 510 of the fourth embodiment. Therefore, for the sake of brevity and clarity, redundant descriptions and numbering will be generally avoided here. Unless otherwise specified, the detailed descriptions of the elements presented above with respect to the first through fourth embodiments should therefore be understood to apply at least generally to the fifth embodiment, as well.

Similarly to the conveyor systems 10, 210, 410, and 510, the conveyor system 610 of the fifth preferred embodiment preferably comprises a conveyor assembly 612 and a vehicle (not shown). Furthermore, in a preferred embodiment, the conveyor assembly 612 broadly includes a conveyor module 614, a chassis 616, and a power module 618.

The conveyor module 614 preferably includes a pair of independent conveyor belts 620 and 622 and a pair of identical but oppositely oriented partially powered roller assemblies (only a first roller assembly 624 is shown). As shown with respect to the conveyor system 510 of the fourth preferred embodiment, the first roller assembly 624 and the second roller assembly (not shown) of the fifth preferred embodiment are preferably spaced from one another in a fore-aft direction or, alternatively stated, along a longitudinal/fore-aft axis of the conveyor module 614.

Furthermore, as also shown with respect to the conveyor system 510 of the fourth embodiment, the first roller assembly 624 and the second roller assembly (not shown) are preferably oppositely oriented. More particularly, the first partially powered roller assembly 624 preferably includes first powered and passive axial sections 624a and 624b. Similarly, the second partially powered roller assembly preferably includes second powered and passive axial sections (not shown). The conveyor belt 620 preferably extends along the longitudinal or fore-aft axis to form a single, continuous (i.e., endless) loop around the powered axial section 624a of the first partially powered roller assembly 624 and the passive axial section (not shown) of the second partially powered roller assembly (not shown). Similarly, the conveyor belt 622 preferably extends along the longitudinal or fore-aft axis to form a single, continuous (i.e., endless) loop around the passive axial section 624b of the first partially powered roller assembly 624 and the powered axial section (not shown) of the second partially powered roller assembly (not shown).

For conciseness and clarity, only the first partially powered roller assembly 624 is illustrated and described in detail herein. However, as noted above, the second partially powered roller assembly (not shown) is preferably identical (but oppositely oriented) to the first partially powered roller assembly 624. Thus, descriptions provided herein with reference to the first partially powered roller assembly 624 should be understood to apply to the second partially powered roller assembly (not shown), as well.

Turning now to FIGS. 30 and 31, similarly to the corresponding components of the previously described embodiments, each of the axial sections 624a and 624b of the partially powered roller assembly 624 includes a corresponding roller body 628a or 628b. Furthermore, each roller body 628a and 628b receives a corresponding bearing adapter or roller insert 630a or 630b. Still further, a coupling assembly 632, including couplers 634a and 634b and a connector shaft 636, preferably connects the powered and passive axial sections 624a and 624b.

The coupler 634a and of the first powered axial section 624a is preferably associated with a torque ring 679 (configured as described above with respect to the torque rings 479 and 579) and a motor shaft connector 681 (configured as described above with respect to the motor shaft connectors 488 and 581). Such associations are preferably in the manner described above with regard to the conveyor system 510.

In contrast, the coupler 634b, associated with the first passive axial section 524b, is not associated with a torque ring or motor shaft connector. This is also in keeping with the configuration described above with regard to the conveyor system 510.

The couplers 634a and 634b are preferably similar in many regards to the previously described couplers 454a, 454b, 466a, 466b, 534a, and 534b. For instance, the coupler 634a includes both a torque transmission portion 678 and a bearing cartridge portion 680. The coupler 634b is preferably identical to the coupler 634b and thus likewise includes these portions. A key distinction between the couplers 634a and 634b of the fifth preferred embodiment and those of the previously described embodiments will be discussed in greater detail below.

First however, it is noted that similarly to previously discussed embodiments, the power module 618 preferably includes a motor assembly 638 at least substantially disposed within the roller body 628a, as well as corresponding motor assembly (not shown) associated with the second partially powered roller assembly (not shown). A divider 640 is also preferably provided.

In view of the above, the conveyor assembly 612 can be understood to include two identical but oppositely oriented side-by-side subassemblies 642a and 642b. The first subassembly 642a includes the powered roller body 628a, the passive roller body of the passive section of the second roller assembly (not shown), the conveyor belt 620, the motor assembly 638, the bearing insert 630a, the bearing insert of the passive section of the second roller assembly (not shown), the coupler 634a, and the coupler of the passive section of the second roller assembly (not shown). The second subassembly 642b includes the passive roller body 628b, the powered roller body of the powered section of the second roller assembly (not shown), the conveyor belt 622, the motor assembly of the powered section of the second roller assembly (not shown), the bearing insert 630b, the bearing insert of the powered section of the second roller assembly (not shown), the coupler 634b, and the coupler of the powered section of the second roller assembly (not shown).

Turning now to key distinctions, as will be readily apparent from FIGS. 30 and 31, the couplers 634a and 634b of the fifth preferred embodiment present significantly longer axial (i.e., lateral) lengths, both nominally and relative to other components of the conveyor system 610, than the couplers 454a, 454b, 466a, 466b, 534a, and 534 of the third and fourth embodiments.

For instance, the couplers 634a and 634b present respective axial lengths that are between about twenty-five (25) percent and about seventy-five (75) percent of the lateral width of the corresponding ones of the belts 620 and 622. More specifically, the couplers 634a and 634b present respective axial lengths that are between about thirty-three

(33) percent and about sixty-six (66) percent of the lateral width of the corresponding ones of the belts 620 and 622. Most specifically, the couplers 634a and 634b present respective axial lengths that are about fifty (50) percent of the lateral width of the corresponding ones of the belts 620 and 622.

It is also noted that the belts 620 and 622 and, in a broad sense, the conveyor module 614 as a whole, are each laterally wider than the corresponding elements of the conveyor systems 10, 210, 310, 410, and 510. Among other things, such increased width enables transport of larger packages/cargo.

Still further, it is noted that the extended length of the coupler 634a results in a general centralization within the powered axial section 624a of the various power-generating and power-transferring elements (e.g., the motor assembly 638, the motor shaft connector 681, the torque ring 679, and the torque transmission portion 478 of the coupler 634a).

The coupler 634a also provides substantial structural support to the belt 620 (with additional support provided by the powered roller body 628a).

The design of the coupler 634 is also highly advantageous to the conveyor system 610 in a broad sense in that lateral expansion and contraction of the system 610 as a whole may be achieved simply through a change in the lateral extent of the coupler 634a and a corresponding change in the width of the associated belt 620 and chassis 616 (and/or similar adjustments to the coupler 634b and belt 622). That is, modifications to the motor assembly 638, the motor shaft connector 681, the torque ring 679, the roller body 628a and so on are unnecessary to revise the lateral width of an existing conveyor system 610.

Alternatively, considered from an initial production perspective rather than the above-described post-production modification perspective, it will be readily apparent to those of ordinary skill in the art that the remaining components such as the motor assembly 638, the motor shaft connector 681, the torque ring 679, the roller body 628a, and so on may be manufactured for initial use in conveyor systems of any of a variety of lateral widths. That is, the parts of the system excluding the couplers, belts, and chassis may be produced and to at least some extent assembled without regard for final use.

Finally, it is noted that the advantages described above with regard to the conveyor system 410 of the third embodiment and the conveyor system 510 of the fourth embodiment also apply to the conveyor system 610 of the fifth embodiment.

CONCLUSION

Features of one or more embodiments described above may be used in various combinations with each other and/or may be used independently of one another. For instance, although a single disclosed embodiment may include a preferred combination of features, it is within the scope of certain aspects of the present invention for the embodiment to include only one or fewer than all of the disclosed features, and one or more features of another embodiment, unless the specification expressly states otherwise or as might be understood by one of ordinary skill in the art. Therefore, embodiments of the present invention are not necessarily limited to the combination(s) of features described above.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

Although the above description presents features of preferred embodiments of the present invention, other preferred embodiments may also be created in keeping with the principles of the invention. Furthermore, as noted previously, these other preferred embodiments may in some instances be realized through a combination of features compatible for use together despite having been presented independently as part of separate embodiments in the above description.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A conveyor assembly for use with a mobile vehicle, said conveyor assembly comprising:
   a conveyor module including a first roller assembly,
   said first roller assembly including a first rotatable roller body and a second rotatable roller body,
   said first and second roller bodies being interconnected to each other in such a manner as to share a first rotational axis yet be at least substantially rotationally independent of each other, such that each of said first and second roller bodies can rotate without causing or interfering with rotation of the other of said first and second roller bodies,
   said first roller assembly further including a first coupling assembly,
   said first coupling assembly including—
      a first axially extending coupler,
      a second axially extending coupler, and
      a first connector shaft extending between and interconnecting said first and second couplers,
   each of said couplers being at least in part received within the corresponding one of the roller bodies; and
   a pair of tolerance rings,
   each of said tolerance rings at least in part circumscribing a corresponding one of said couplers and facilitating press-in insertion of said coupler into the corresponding one of the roller bodies, such that engagement of said coupler with the corresponding one of the roller bodies via the tolerance ring results in transfer of rotation of said coupler to the roller body.

2. The conveyor assembly of claim 1,
   each of said tolerance rings presenting arcuately spaced apart ends.

3. The conveyor assembly of claim 1,
   each of said tolerance rings including a plurality of radially outwardly projecting, deformable ribs for engaging the corresponding one of the roller bodies.

4. The conveyor assembly of claim 3,
   said ribs being arcuately spaced apart.

5. The conveyor assembly of claim 1,
   said first coupler extending axially from the first roller body toward the second roller body,
   said second coupler extending axially from the second roller body toward the first roller body.

6. The conveyor assembly of claim 1,
   said conveyor module further including a second roller assembly spaced from the first roller assembly in a fore-aft direction, said second roller assembly including a third rotatable roller body and a fourth rotatable roller body, said third and fourth roller bodies being interconnected to each other in such a manner as to share a second rotational axis yet be at least substantially rotationally independent of each other, such that each of said third and fourth roller bodies can rotate without causing or interfering with rotation of the other of said third and fourth roller bodies.

7. The conveyor assembly of claim 6, said first and second roller assemblies being at least substantially structurally identical to each other.

8. The conveyor assembly of claim 6, said conveyor module further including—
   a first conveyor belt extending about said first and third roller bodies, and
   a second conveyor belt extending about said second and fourth roller bodies, said conveyor assembly further comprising a chassis,
said chassis including a single, unitary slider bed underlying at least a portion of each of said first and second conveyor belts.

9. The conveyor assembly of claim 8, said chassis further including a pair of side rails each extending in the fore-aft direction, said slider bed extending between the side rails, each of said first and second roller assemblies being mounted to the side rails such that the first and second conveyor belts are disposed laterally between the side rails.

10. The conveyor assembly of claim 6, said conveyor module further including—
   a first conveyor belt extending about said first and third roller bodies, and
   a second conveyor belt extending about said second and fourth roller bodies,
said conveyor assembly further including a power module providing rotational power to said conveyor module such that said first and second conveyor belts are independently shiftable relative to one another.

11. The conveyor assembly of claim 6, further comprising:
   a power module,
   said power module including a pair of independently operable motor assemblies each including a motor,
   each of said motors configured to drive independent rotation of a respective one of said roller bodies.

12. The conveyor assembly of claim 11,
   a first one of said motors configured to drive rotation of the first roller body,
   a second one of said motors configured to drive rotation of the second roller body,
   said first roller assembly thereby being a dually-powered roller assembly.

13. The conveyor assembly of claim 12,
   each of said third and fourth roller bodies being passively rotatable upon corresponding driven rotation of the first and second roller bodies, respectively,
   said second roller assembly thereby being a passive roller assembly.

14. The conveyor assembly of claim 13,
   a first one of said motors configured to drive rotation of the first roller body,
   a second one of said motors configured to drive rotation of the fourth roller body.

15. The conveyor assembly of claim 14,
   each of said third and second roller bodies being passively rotatable upon corresponding driven rotation of the first and fourth roller bodies, respectively,
   each of said first and second roller assemblies thereby being combined powered/passive roller assemblies.

16. The conveyor assembly of claim 1,
   each of said couplers including a torque transmission portion and a bearing portion.

17. The conveyor assembly of claim 16,
   said torque transmission portion including a plurality of axially extending torque transmission pins,
   said bearing portion including a bearing housing and a bearing received within the bearing housing.

18. The conveyor assembly of claim 17,
   said torque transmission pins and said bearing housing being integrally formed.

19. The conveyor assembly of claim 16, further comprising:
   a torque ring corresponding to a respective one of the torque transmission portions and configured to transfer rotation thereto.

20. The conveyor assembly of claim 19, further comprising:
   a motor assembly operable to drive rotation of the torque ring.

* * * * *